United States Patent [19]
Kawasaki et al.

[11] Patent Number: 5,734,641
[45] Date of Patent: Mar. 31, 1998

[54] DEVICE AND METHOD FOR DISCRIMINATING TIMEOUT

[75] Inventors: Takeshi Kawasaki; Jyoei Kamoi, both of Kawasaki, Japan

[73] Assignee: Fujitsu Limited, Kanagawa, Japan

[21] Appl. No.: 794,411

[22] Filed: Feb. 5, 1997

Related U.S. Application Data

[63] Continuation of Ser. No. 435,832, May 5, 1995, abandoned.

[30] Foreign Application Priority Data

Jun. 10, 1994 [JP] Japan ................................. 6-128804

[51] Int. Cl.⁶ .................................................. H04J 3/14
[52] U.S. Cl. ...................... 370/242; 370/395; 395/185.08
[58] Field of Search .................................. 370/242, 252, 370/395; 395/185.08, 182.02, 185.01

[56] References Cited

U.S. PATENT DOCUMENTS

| | | | |
|---|---|---|---|
| 5,012,435 | 4/1991 | Bailey et al. | 395/185.08 |
| 5,241,534 | 8/1993 | Omuro et al. | 370/16 |
| 5,291,491 | 3/1994 | Hutchison et al. | 370/85.5 |
| 5,379,307 | 1/1995 | Ishibashi et al. | 395/185.08 |
| 5,390,324 | 2/1995 | Burckhartt et al. | 395/185.08 |
| 5,477,476 | 12/1995 | Schanin et al. | 395/750 |
| 5,581,794 | 12/1996 | Lin et al. | 395/185.08 |

FOREIGN PATENT DOCUMENTS

| | | |
|---|---|---|
| 54-23573 | 2/1979 | Japan . |
| 1-31245 | 2/1989 | Japan . |
| 5-158748 | 6/1993 | Japan . |

OTHER PUBLICATIONS

"Study Group XVIII—Report R 122" (7 Sheets), Jul. 1992 Recommendations of the 1.600–Series Submitted for Approval at the Xth CCITT Plenary Assembly pp. 15, 16, 17, 18, & 19.

*Primary Examiner*—Douglas W. Olms
*Assistant Examiner*—Min Jung
*Attorney, Agent, or Firm*—Helfgott & Karas, P.C.

[57] ABSTRACT

A device for discriminating timeout comprises an event discrimination unit, a calculation unit, a timing storage unit and a timeout discrimination unit. The event discrimination unit outputs each communication information concerning each communication to the calculation unit, when an event indicating a start of timeout discrimination occurred. The calculation unit calculates a timeout timing for every communication on the basis of the each communication information and the timing in which the event has occurred, and writes the calculated timeout timing into the timing storage unit. The timeout discrimination unit compares the timeout timing read out from the timing storage unit for every communication with the present timing, and discriminates that the timeout has occurred in reference to the communication when the present timing exceeds the timeout timing.

18 Claims, 15 Drawing Sheets

DEVICE AND METHOD FOR DISCRIMINATING TIMEOUT

This is a continuation of application Ser. No. 08/435,832, filed May 5, 1995, now abandoned.

BACKGROUND OF THE INVENTION

The present invention relates to a device and a method for discriminating timeout which detects a communication abnormality by discriminating it as a timeout, when a predetermined event has not occurred within a predetermined interval since one event occurred in a communication device.

Up to the present, the communication abnormality has occurred in the communication device, when the predetermined event has not occurred within a constant interval since one event occurred in the communication device.

For instance, when the next cell has not occurred within the predetermined interval since a cell occurred as the event in a ATM (Asynchronous Transfer Mode) network, the communication abnormality has occurred in the ATM network.

For this reason, a device for discriminating timeout has been used up to the present. The device for discriminating timeout has detected the communication abnormality by discriminating it as a timeout, when the predetermined event has not occurred within the constant interval since one event occurred.

The device for discriminating timeout sets the timing the event has occurred by a timer, and starts counting the interval from the timing, when one event occurred. Then, the device discriminated the timeout had occurred, when the predetermined event did not occur until the timer counted the predetermined interval.

However, the timer had to be prepared for the every communication, when the conventional device for discriminating timeout deals with a plurality of communications (channels). For this reason, a hardware construction of the device for discriminating timeout has become complicated.

SUMMARY OF THE INVENTION

An object of the present invention is to provide a device and a method for discriminating timeout which discriminates the timeout and is low-priced, and whose construction is simple.

The present invention comprises an event discrimination unit, a timing storage unit, a calculation unit and a timeout discrimination unit. The event discrimination unit discriminates whether or not an event indicating a start of timeout discrimination has occurred in a communication device for executing a plurality of communications, and outputs each communication information concerning each communication of the plurality of communications when the event occurred. The timing storage unit stores a predetermined timeout timing for the every communication.

The calculation unit calculates the timeout timing for the every communication on the basis of the each communication information outputted from the event discrimination unit and the timing in which the event occurred, and writes the calculated timeout timing into the timing storage unit.

The timeout discrimination unit compares the timeout timing read out from the timing storage unit for the every communication with the present timing, and discriminates that the timeout has occurred in reference to the communication when the present timing exceeds the timeout timing.

Although the device for discriminating timeout of the present invention is composed of the above-mentioned essential components, it will be also organized even if the components are concretely as follows.

The event discrimination unit inputs cells of fixed length including the each communication information in order from the communication device.

The timeout discrimination unit stores an occurrence information indicating an occurrence of the timeout in the timing storage unit, when it discriminates the occurrence of the timeout. The timeout discrimination unit has a timeout cell generating unit for generating a timeout cell from the occurrence information and the empty cell, and transmitting the timeout cell to the outside, when an empty cell is inputted as the cell by the event discrimination unit.

The each communication information is one identification information among a virtual path identifier indicating a destination, a virtual channel identifier indicating a destination, and a message identifier for discriminating a message, and the each discrimination information consists of a plurality of bits.

The timeout discrimination unit has a conversion table for converting one identification information consisting of the plurality of bits into a reduced identifier consisting of bits which are smaller than the plurality of bits.

The timing storage unit stores the timeout timing for the every reduced identifier which is converted by the conversion table. The timeout discrimination unit compares the timeout timing for the every reduced identifier which is read out from the timing storage unit with the present timing, and discriminates that the timeout has occurred in reference to the reduced identifier when the present timing exceeds the timeout timing.

The timeout discrimination unit assigns the reduced identifier to each communication, when the event occurred, and releases the reduced identifier in one of the end of the event and the timeout occurrence. The device for discriminating timeout further comprises a counting unit, an adder, a readout unit and a comparator. The counting unit counts up the present timing per the one cell processing interval one by one, when the number of communication discriminations of the timeout to be discriminated within one cell processing interval is smaller than the number of the plurality of communications.

The adder adds the number of divisions which are obtained by dividing the number of the plurality of communications by the number of communication discriminations to the present timing counted by the counting unit. The readout unit executes a readout processing for reading out the timeout timing of the number of communication discriminations per communication stored in the timing storage unit within the one cell processing interval in order, and reads out all of the timeout timings by executing the readout processing repeatedly within the cell processing interval of the number of divisions.

The comparator discriminates that the timeout has occurred in reference to the communication when the read out timeout timing from the readout unit for the every communication is within the range from the present timing counted by the counting unit to the timing obtained by the adder.

Besides, the device for discriminating timeout further comprises a counting unit, a readout unit and a comparator. The counting unit counts up the present timings one by one per cell processing intervals of the number of divisions which was obtained by dividing the number of the plurality of communications by the number of communication discriminations, when the number of communication discriminations of the timeout to be discriminated within one cell processing interval is smaller than the number of the plurality of communications.

The readout unit executes a readout processing for reading out the timeout timing of the number of communication discriminations for the every communication stored in the timing storage unit within the one cell processing interval in order, and reads out all of the timeout timings by executing the readout processing repeatedly within the cell processing interval of the number of divisions.

The comparator discriminates that the timeout has occurred in reference to the communication when the timeout timings read out from the readout unit for the every communication conforms with the present timing counted by the counting step.

A method for discriminating timeout of the present invention comprises an event discrimination step, a calculation step, a storage step and a timeout discrimination step.

The event discrimination step discriminates whether or not an event indicating a start of timeout discrimination has occurred, and outputs each communication information concerning each communication of a plurality of communications, when the event occurred. The calculation step calculates a timeout timing for the every communication on the basis of outputted each communication information and the timing in which the event occurred.

The storage step stores the calculated timeout timing for the every communication. The timeout discrimination step compares the stored timeout timing for the every communication with the present timing, and discriminates that the timeout has occurred in reference to the communication when the present timing exceeds the timeout timing.

Although the method for discriminating timeout of the present invention is composed of the above-mentioned essential processes, it will be also organized even if the processes are concretely as follows.

The event discrimination step inputs cells of fixed length including each of the communication informations in order. The timeout discrimination step stores an occurrence information indicating the occurrence of the timeout, when it discriminates that the timeout has occurred, and generates a timeout cell from the occurrence information and the empty cell and transmits the timeout cell to the outside, when the empty cell is inputted as the cell.

The each communication information is one identification information among a virtual path identifier indicating a destination, a virtual channel identifier indicating a destination and a message identifier for identifying the message, and the each identification information consists of a plurality of bits.

The timeout discrimination step converts one identification information consisting of the plurality of bits into a reduced identifier consisting of bits which are smaller than the plurality of bits. The storage step stores the timeout timing for the every converted reduced identifier. The timeout discrimination step compares the stored timeout timing for the every reduced identifier with the present timing, and discriminates that the timeout has occurred in reference to the reduced identifier when the present timing exceeds the timeout timing.

The timeout discrimination step assigns the reduced identifier to the each communication when the event occurred, and releases the reduced identifier in one of the end of the event and the timeout occurrence.

Further, the method for discriminating timeout of the present invention comprises a counting step, an addition step, a readout step and a comparison step. The counting step counts up the present timing per one cell processing interval one by one, when the number of communication discriminations of the timeout to be discriminated within the one cell processing interval is smaller than the number of the plurality of communications. The addition step adds the number of divisions which are obtained by dividing the number of the plurality of communications by the number of communication discriminations to the counted present timing.

The readout step executes a readout processing for reading out the stored timeout timing of the number of communication discriminations for the every communication within the one cell processing interval in order, and reads out all of the timeout timings by executing the readout processing repeatedly within the cell processing interval of the number of divisions. The comparison step discriminates that the timeout has occurred in reference to the communication when the read out timeout timing for the every communication is within the range from the counted present timings to the timing obtained by the addition step.

Besides, the method for discriminating timeout of the present invention further comprises a counting step, a readout step and a comparison step. The counting step counts up the present timing one by one per cell processing intervals of the number of divisions obtained by dividing the number of the plurality of communications by the number of communication discriminations, when the number of communication discriminations of the timeout to be discriminated within one cell processing interval is smaller than the number of the plurality of communications.

The readout step executes a readout processing for reading out the stored timeout timing of the number of communication discriminations for the every communication within the one cell processing interval in order, and reads out all of the timeout timings by executing the readout processing repeatedly within the cell processing interval of the number of divisions. The comparison step discriminates that the timeout has occurred in reference to the communication when the read out timeout timing for the every communication conforms with the counted present timing.

According to the device for discriminating timeout of the present invention, the event discrimination unit outputs each communication information concerning each communication to the calculation unit, when an event indicating a start of timeout discrimination occurred. The calculation unit calculates the timeout timing for the every communication on the basis of the each communication information and the timing in which the event occurred, and writes the calculated timeout timing into the timing storage unit.

Then, the timeout discrimination unit compares the timeout timing read out from the timing storage unit for the every communication with the present timing, and discriminates that the timeout occurred in reference to the communication, when the present timing exceeds the timeout timing.

Accordingly, the device for discriminating timeout whose construction is simple and which is low-priced can be provided, since a plurality of communications can be executed without using a plurality of timers.

Besides, the timeout can be discriminated for the every communication, since the event discrimination unit discriminates the generation of the cell by inputting the cell of the fixed length including each communication information from the communication device in order.

When the occurrence information indicating the occurrence of the timeout is stored in the timing storage unit, and the timeout cell generating unit generates a timeout cell from the occurrence information and the empty cell and transmits the timeout cell to the outside, the timeout can be notified to the outside.

When the each communication information is one discrimination information among a virtual path identifier, a virtual channel identifier and a message identifier, the occurrence of the timeout can be discriminated for the every discrimination information.

The conversion table converts the discrimination information consisting of a plurality of bits into a reduced identifier consisting of the bits which are smaller than the plurality of bits. The memory capacity can be kept small, since the timeout timing is stored in the timing storage unit for the every converted reduced identifier.

A plurality of communications can be executed with a few reduced identifiers by assigning the reduced identifier to the each communication when the event occurred, and releasing the reduced identifier in one of the end of the event and the timeout occurrence.

When the number of communication discriminations of the timeout to be discriminated within one cell processing interval is smaller than the number of the plurality of communications, the cell processing interval of the number of divisions in which the number of the plurality of communications was divided by the number of communication discriminations is required for discriminating all of the number of communications. Besides, it sometimes happens that the timeout occurs in a communication within the interval.

For this reason, the readout unit reads out the stored timeout timing of the number of communication discriminations for the every communication within the one cell processing interval in order, and reads out all of the timeout timings by executing the readout processing repeatedly within the cell processing interval of the number of divisions. The comparator can discriminate that the timeout has occurred in reference to the communication, when the timeout timing read out from the readout unit for the every communication is within the range from the present timing counted by the counting unit to the timing obtained by the adder.

Besides, the comparator can discriminate that the timeout has occurred in reference to the communication, when the timeout timing read out from the readout unit for the every communication conforms with the present timing counted by the counting unit.

DETAILED DESCRIPTION OF THE PREFERRED EMBODIMENTS

The concrete embodiments of a device and a method for discriminating timeout of the present invention will be described as follows.

<EMBODIMENT 1>

Figure 1:
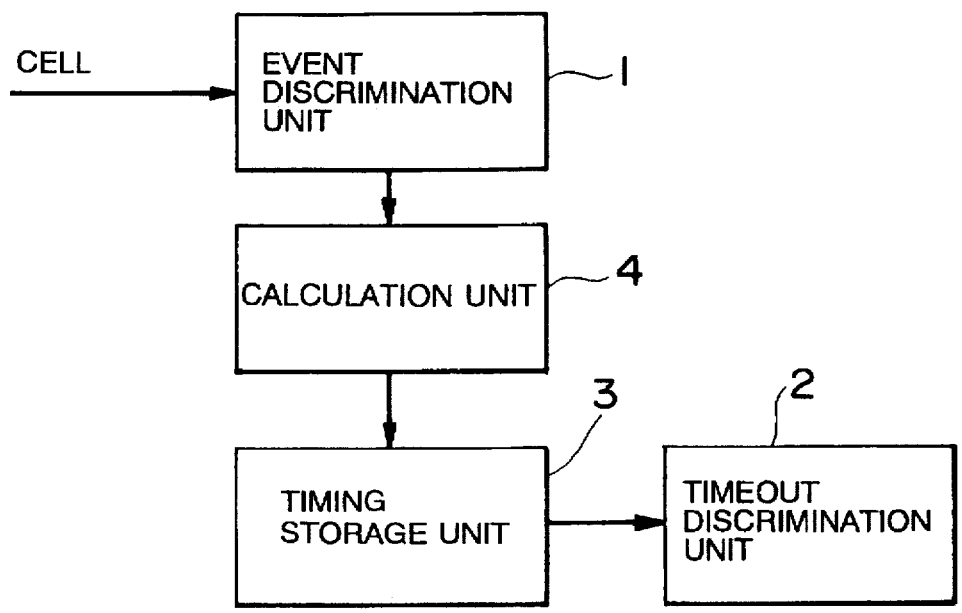
FIG. 1 is a construction diagram indicating a device for discriminating timeout according to the embodiment 1 of the present invention.

FIG. 1 is a construction diagram indicating a device for discriminating timeout according to the embodiment 1 of the present invention. The device for discriminating timeout comprises an event discrimination unit 1, a calculation unit 4 connected to the event discrimination unit 1, a timing storage unit 3 connected to the calculation unit 4 and a timeout discrimination unit 2 connected to the timing storage unit 3.

The event discrimination unit 1 outputs each communication information concerning each communication to the calculation unit 4, when an event indicating a start of timeout discrimination occurred. The event discrimination unit 1 is, for instance, a flip flop circuit.

The event is, for instance, an OAM (Operation Administration Maintenance) cell and a BOM (Beginning of Message) of AAL Type ¾ in ATM network. The event discrimination unit 1 discriminates an arrival of the event. The communication information is, for instance, a VPI (Virtual Path Identifier) indicating a destination, a VCI (Virtual Channel Identifier) indicating a destination and a MID (Message Identifier).

The Calculation unit 4 calculates a timeout timing for the every communication on the basis of the each communication information and the timing in which the event occurred and writes the calculated timeout timing into the timing storage unit 3. The calculation unit 4 is, for instance, an adder and so on.

The timing storage unit 3 stores the predetermined timeout timing for the every communication. The timing storage unit 3 is, for instance, a writable and readable storage medium. The storage medium is, for instance, a RAM (Random Access Memory), a hard disk and so on.

The timeout discrimination unit 2 compares the timeout timing read out from the timing storage unit for the every communication with the present timing, and discriminates that the timeout has occurred in reference to the communication when the present timing exceeds the timeout timing. The timeout discrimination unit 2 includes a comparator and so on.

Figure 2:
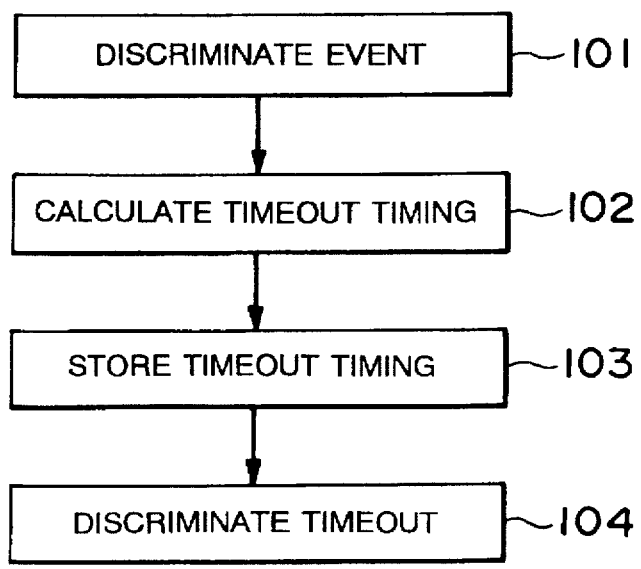
FIG. 2 is a flowchart indicating a method for discriminating timeout according to the embodiment 1 of the present invention.

Then, the method for discriminating timeout according to the embodiment 1 will be described by referring to FIG. 2. First of all, the event discrimination unit 1 discriminates whether or not an event indicating a start of timeout discrimination has occurred (Step 101).

The event discrimination unit 1 outputs each communication information concerning each communication to the calculation unit 4, when the event occurred. The calculation unit 4 calculates a timeout timing for the every communication on the basis of the each communication information and the timing in which the event occurred (Step 102). The calculation unit 4 writes the calculated timeout timing into the timing storage unit 3 (Step 103).

After that, the timeout discrimination unit 2 compares the timeout timing read out from the timing storage unit 3 for the every communication with the present timing. Then, the timeout discrimination unit 2 discriminates that the timeout has occurred in reference to the communication, when the present timing exceeds the timeout timing (Step 104).

Namely, the timeout timing is stored for the every communication, and the occurrence of the timeout is discriminated when the present timing exceeds the timeout timing for the every communication. Accordingly, the device for discriminating timeout whose construction is simple and which is low-priced can be provided, since a plurality of communications can be executed without using a plurality of timers.

<EMBODIMENT 2>

Figure 3:
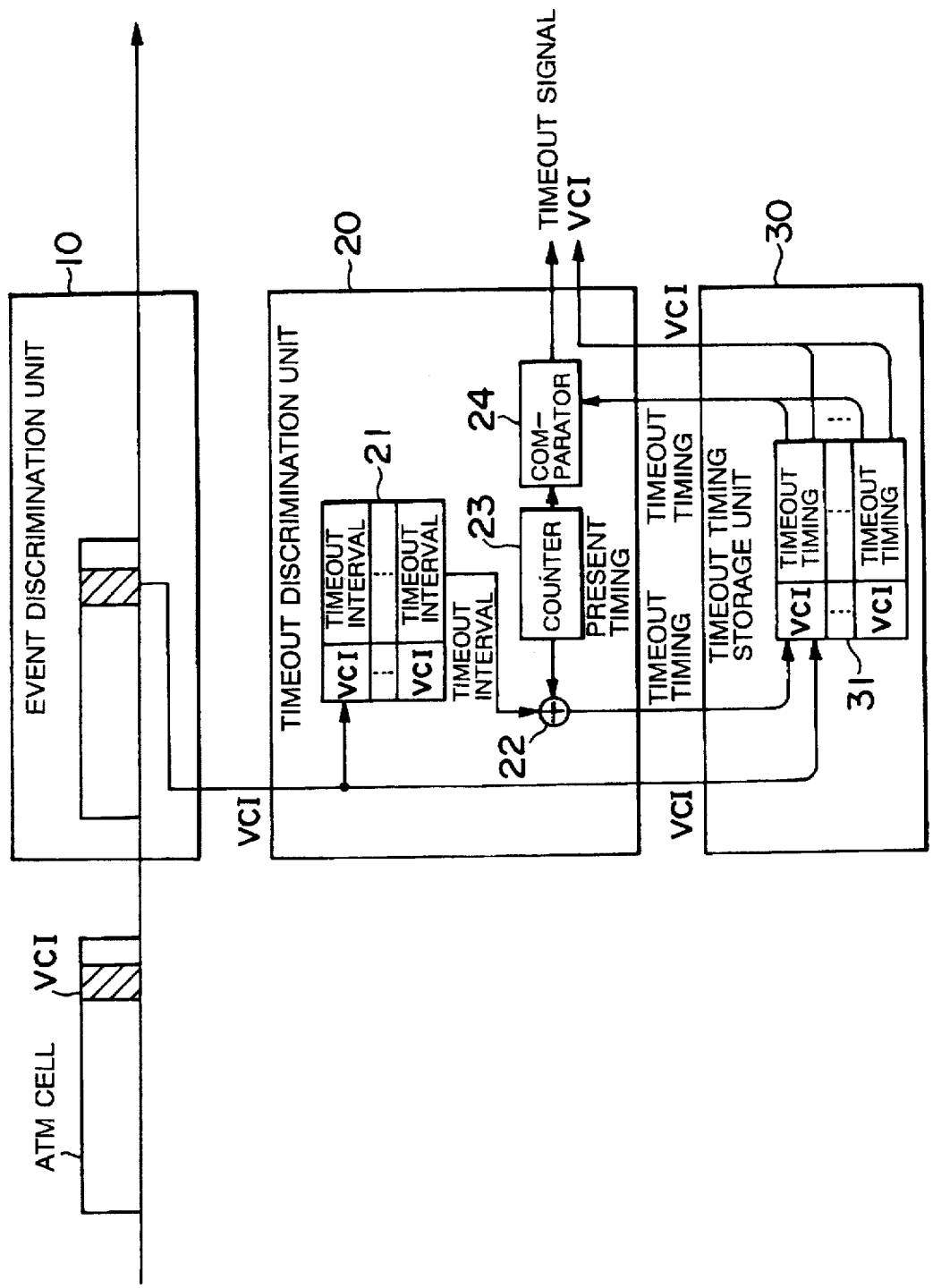
FIG. 3 is a construction diagram indicating a device for discriminating timeout according to the embodiment 2 of the present invention.

FIG. 3 is a construction diagram indicating a device for discriminating timeout according to the embodiment 2 of the present invention. In FIG. 3, the device for discriminating timeout inputs a cell of fixed length in order from ATM network, and executes a timeout discrimination of cell interval per VCI.

The device for discriminating timeout comprises an event discrimination unit 10, a timeout discrimination unit 20 connected to the event discrimination unit 10, a timeout timing storage unit 30 connected to the timeout discrimination unit 20. For instance, the VCI consists of informations of 16 bits.

For instance, the event discrimination unit 10 is composed of flip flop circuits. The event discrimination unit 10 discriminates whether or not the cell has arrived from the ATM network and discriminates the VCI included in the cell which has arrived, and notifies the discriminated VCI to the timeout discrimination unit 20 and the timeout timing storage unit 30.

The timeout discrimination unit 20 discriminates that the timeout has occurred when the next cell has not occurred within the predetermined interval since the cell occurred, on the basis of the VCI notified from the event discrimination unit 10. The timeout discrimination unit 20 comprises a VCI table 21, an adder 22 connected to the VCI table 21, a counter 23 connected to the adder 22 and a comparator 24 connected to the counter 23 and the timeout timing storage unit 30. The timeout interval is notified per VCI from a unillustrated call processing unit to the timeout discrimination unit 20, when the call is set up. The VCI table 21 is installed within a unillustrated memory and stores the timeout timing corresponding to each VCI for the every VCI.

The counter 23 counts the present timing. The adder 22 calculates the timeout timing by adding the present timing counted by the counter 23, namely, the timing in which the cell occurred to the timeout interval corresponding to the VCI from the VCI table 21.

The adder 22 registers the timeout timing corresponding to the VCI of the cell which has arrived from the ATM network in the timeout timing table 31 installed on the timeout timing storage unit 30. The adder 22 renews the timeout timing registered in the timeout timing table 31.

The comparator 24 compares the present timing counted by the counter 23 with the timeout timing of each VCI stored in the timeout timing storage unit 30. The comparator 24 discriminates that the timeout has occurred in reference to the VCI and outputs a timeout signal to the outside, when the present timing exceeds the timeout timing.

The timeout timing storage unit 30 consists of, for instance, RAM and so on. The timeout timing storage unit 30 has the timeout timing table 31 in which the timeout timing corresponding to the VCI outputted from the timeout discrimination unit 20 for the every VCI is stored.

<OPERATION OF THE EMBODIMENT 2>

Figure 4:
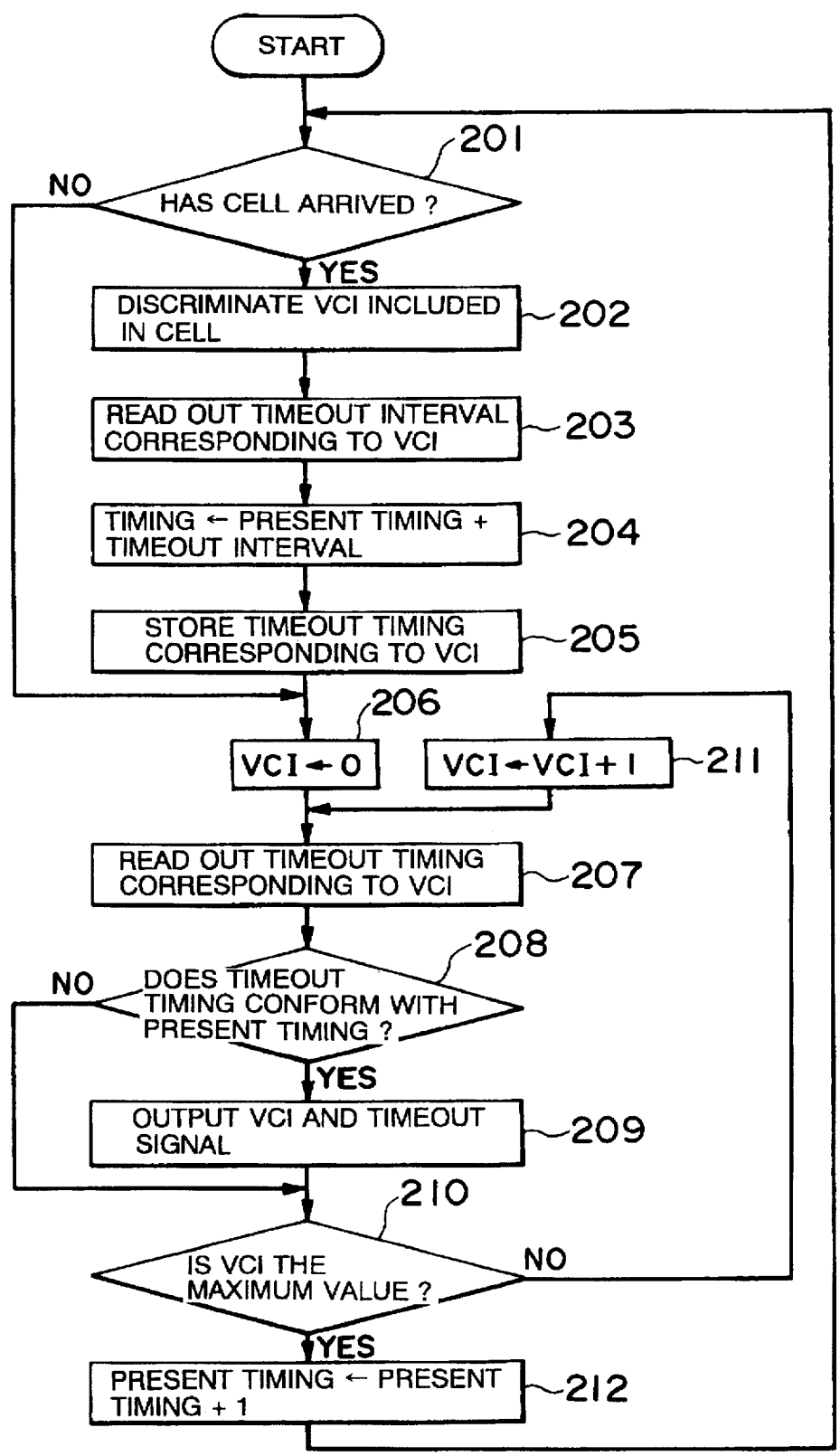
FIG. 4 is a flowchart indicating a method for discriminating timeout according to the embodiment 2 of the present invention.

Then, the method for discriminating timeout of the embodiment 2 will be described by referring to the drawings. The flowchart of the method for discriminating timeout of the embodiment 2 is shown in FIG. 4.

First of all, the event discrimination unit 10 discriminates whether or not the cell has arrived (Step 201). The process proceeds to Step 206, when the cell has not arrived.

On the other hand, the event discrimination unit 10 discriminates the VCI included in the cell, when the cell arrived (Step 202).

Then, the timeout discrimination unit 20 reads out the timeout timing corresponding to the VCI discriminated by the event discrimination unit 10 from the VCI table 21 (Step 203). The adder 22 obtains the timeout timing by adding the timing (the present timing) in which the cell has occurred to the timeout interval read out from the VCI table 21 (Step 204).

Further, the timeout timing storage unit 30 registers the timeout timing corresponding to the VCI of the adder 22 in the parts corresponding to the VCI of the timeout timing table 31 (Step 205). Or, the timeout timing storage unit 30 renews the timeout timing.

Then, the timeout timing storage unit 30 initializes the VCI to "0" (Step 206), and reads out the timeout timing stored in the timeout timing table 31 when the VCI is "0" (Step 207).

Then, the comparator 24 determines whether or not the present timing counted by the counter 23 conforms with the timeout timing read out from the timeout timing table 31 (Step 208). The process proceeds to Step 210, when the present timing does not conform with the timeout timing.

On the other hand, the comparator 24 outputs the VCI and the timeout signal to the outside, when the present timing conforms with the timeout timing (Step 209). Namely, the comparator 24 discriminates that the timeout has occurred in reference to the VCI, when the present timing exceeds the timeout timing.

Then, the timeout timing storage unit 30 discriminates whether or not the VCI is the maximum value (Step 210). Hereupon, the timeout timing storage unit 30 sets VCI in which "1" was added to the VCI as a new VCI (Step 211), and the process returns to Step 207, when the VCI is not the maximum value.

Then, the processes from Step 207 to Step 209 are executed repeatedly until the VCI becomes the maximum value. The comparator 24 reads out each timeout timing and compares the present timing with the each timeout timing, in reference to all of the VCIs stored in the timeout timing storage unit 30.

On the other hand, the counter 23 sets the timing in which "1" was added to the present timing as a new present timing (Step 212), and the process returns to Step 201, when the VCI is the maximum value in Step 210.

Then, the processes from Step 201 to Step 210 are executed repeatedly. Namely, the timeout when the present timing has proceeded only 1, 2 . . . is discriminated.

Further, in the example shown in FIG. 4, the "1" was added to the VCI and the timeout timing was compared with the present timing one after another in reference to the each VCI, for the sake of convenience. For instance, the device for discriminating timeout can be provided with a plurality of comparators, and can compare the timeout timing with the present timing in parallel, in reference to the plurality of VCIs.

As mentioned hereinbefore, the device for discriminating timeout does not have to have the timer for the individual VCI, since the timeout is discriminated by calculating the timeout timing per VCI when the cell occurred, storing the timeout timing and comparing the present timing with the stored timeout timing. For this reason, the scale of the hardware can be kept small. Namely, the device whose construction is simple and which is low-priced can be provided.

Figure 5:
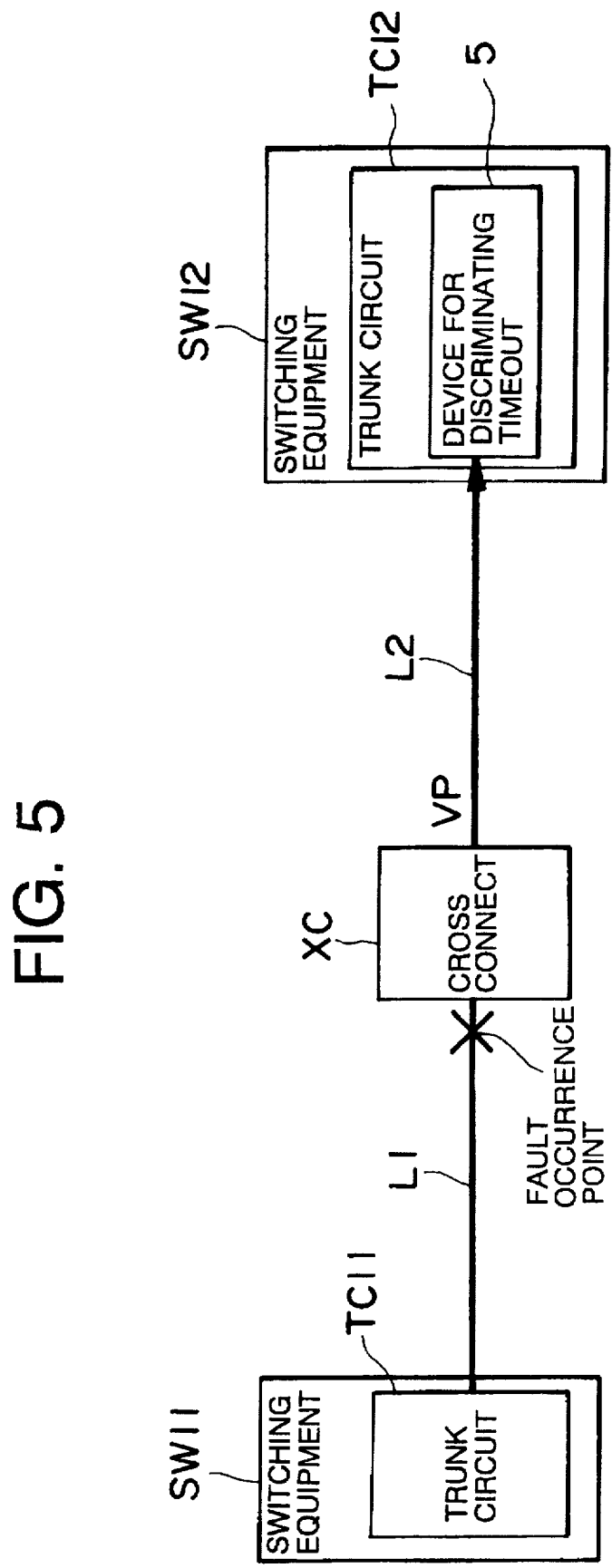
FIG. 5 is a construction diagram indicating an application example 1 of a device for discriminating timeout.

Then, an application example 1 of the device for discriminating timeout will be described. FIG. 5 is a construction diagram of the application example 1 of the device for discriminating timeout. In the example shown in FIG. 5, a cross connect XC is connected to a switching equipment SW11 through the line L1. A switching equipment SW12 is connected to the cross connect XC through the line L2. The switching equipment SW11 is provided with a trunk circuit TC11 connected to the line L1. The switching equipment SW12 is connected to the line L2, and is provided with a trunk circuit TC12 having a VP (Virtual Path) termination. The trunk circuit TC12 is provided with the device for discriminating timeout 5.

Figure 6:
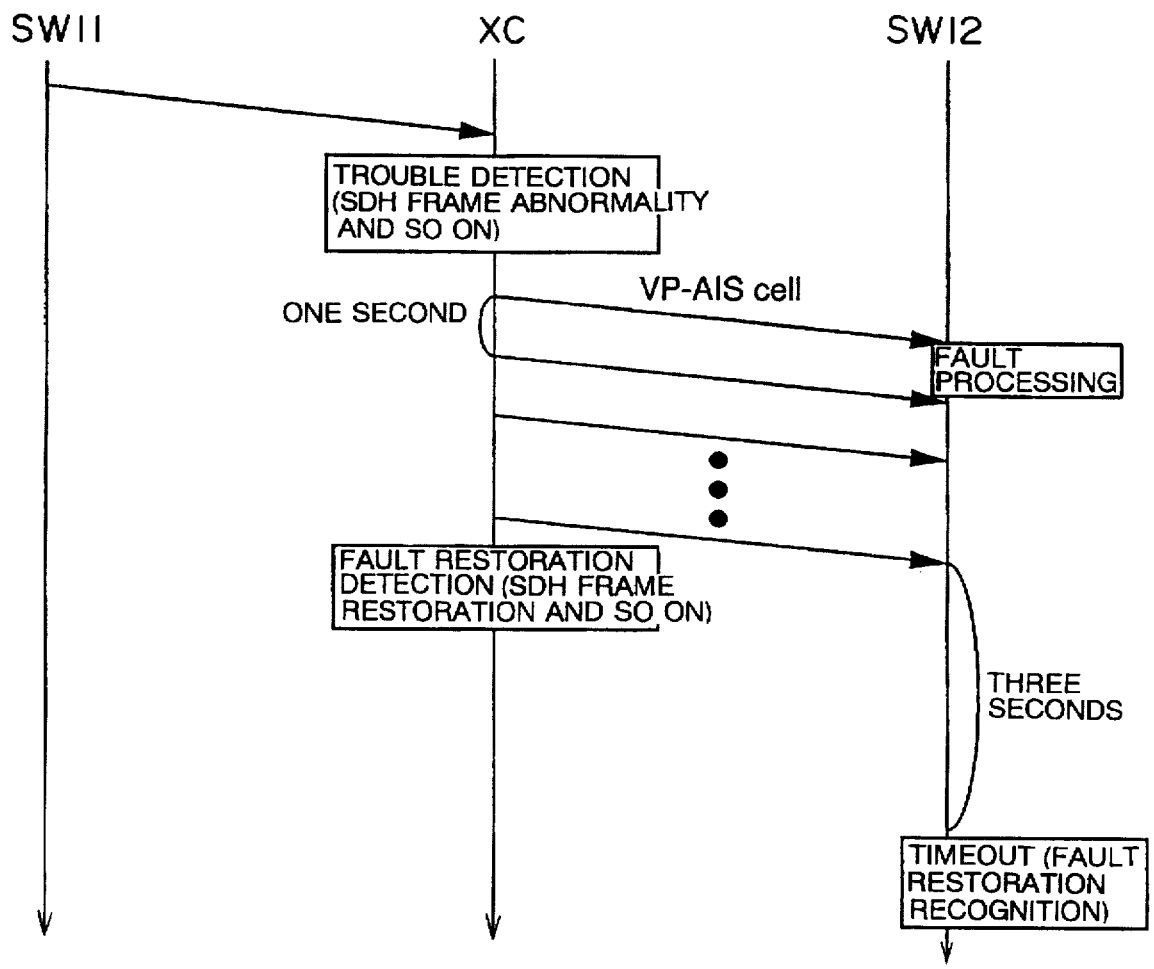
FIG. 6 is a diagram indicating an operation of an application example 1 of a device for discriminating timeout.

FIG. 6 is a diagram indicating an operation of an application example 1 of the device for discriminating timeout. The operation of the application example 1 of the device for discriminating timeout will be described by referring to FIG. 6. The switching equipment SW11 transfers the ATM cell to the cross connect XC through the line L1.

Hereupon, for instance, the cross connect XC detects a trouble by an abnormality of SDH (Synchronous Digital Hierarchy) frame, when a fault of physical layer of the line L1 occurs in a fault occurrence point of the line L1.

Moreover, the cross connect XC transfers a VP-AIS (Alarm Indicate Signal) cell to the switching equipment SW12, for instance, a plural times per one second. The switching equipment SW12 executes a fault processing whenever it receives the VP-AIS cell.

Then, the cross connect XC stops transferring the VP-AIS cell to the switching equipment SW12, when it detects a fault restoration by the restoration of the SDH frame.

The device for discriminating timeout 5 within the switching equipment SW12 discriminates that the timeout has occurred, for instance, when three seconds have passed since it received the VP-AIS for the last time. Namely, the device for discriminating timeout 5 is capable of recognizing that the fault which occurred in the line L1 has been restored. Further, the switching equipment SW12 executes the usual processing.

Figure 7:
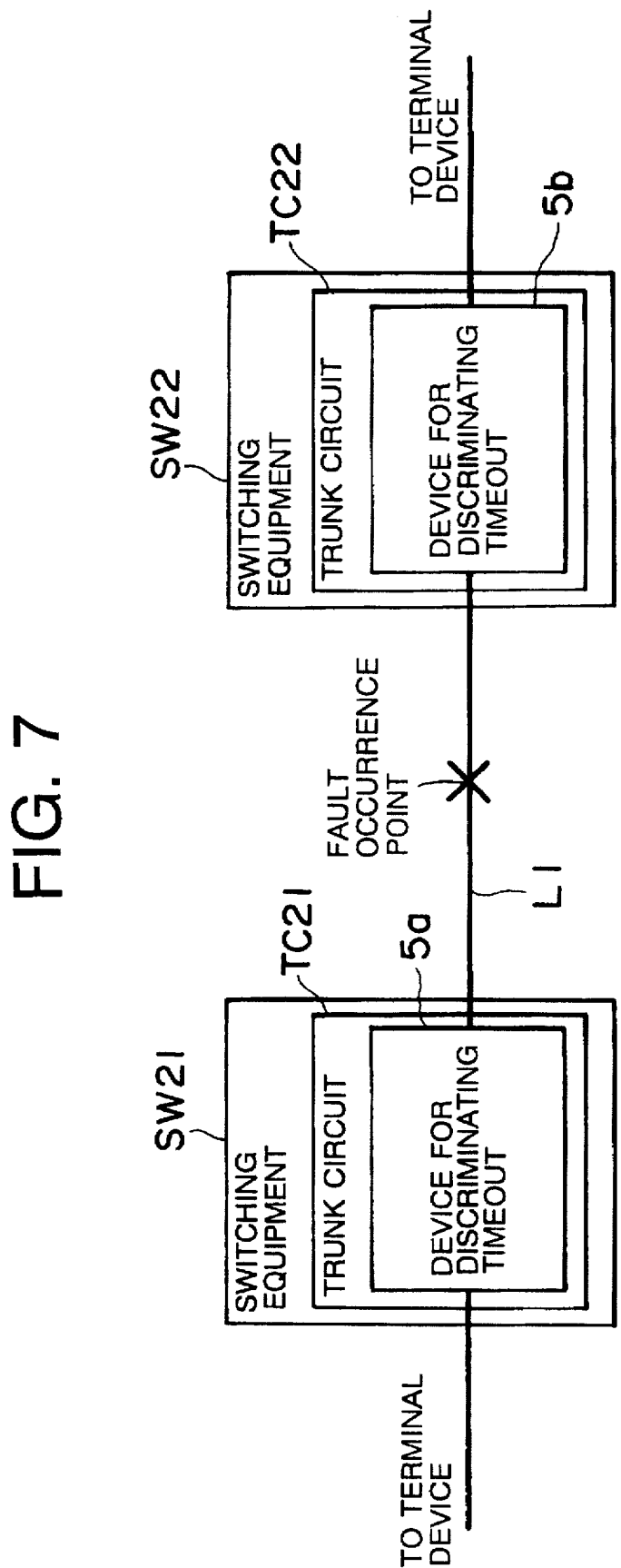
FIG. 7 is a construction diagram indicating an application example 2 of a device for discriminating timeout.

Then, an application example 2 of the device for discriminating timeout will be described. FIG. 7 is a construction diagram indicating the application example 2 of the device for discriminating timeout. In FIG. 7, a switching equipment SW22 is connected to a switching equipment SW21 through the line L1. The switching equipment SW21 and the switching equipment SW22 are installed between the unillustrated terminal devices. The switching equipment SW21 is provided with a trunk circuit TC21 having a device for discriminating timeout 5a. The switching equipment SW22 is provided with a trunk circuit TC22 having a device for discriminating timeout 5b. The trunk circuits TC21 and TC22 deal with a VC (Virtual Channel).

Figure 8:
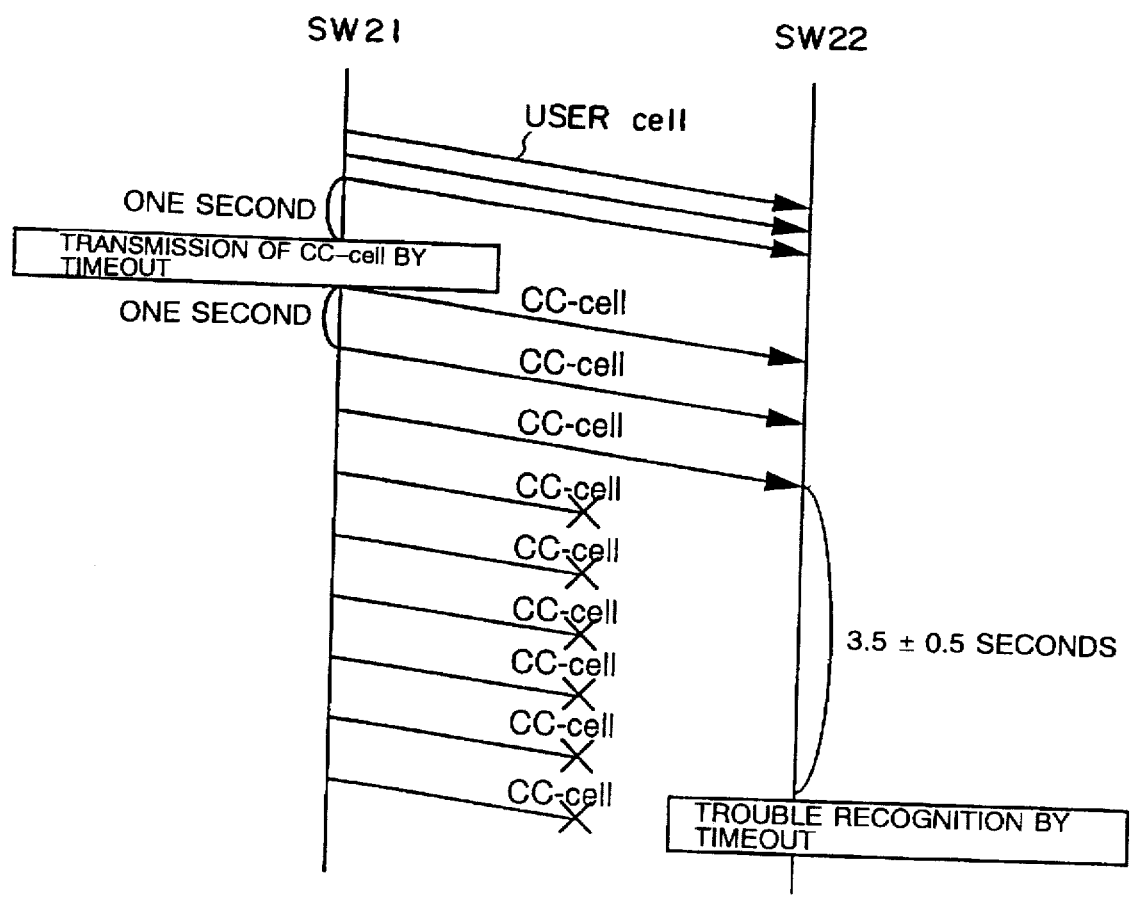
FIG. 8 is a diagram indicating an operation of an application example 2 of a device for discriminating timeout.

FIG. 8 is a diagram indicating an operation of the application example 2 of the device for discriminating timeout. The operation of the application example 2 of the device for discriminating timeout will be described by referring to FIG. 8. The switching equipment SW21 transfers a user cell to the switching equipment SW22 a plurality of times through the line L1.

Hereupon, the device for discriminating timeout 5a sets, for instance, one second as the timeout timing whenever it transfers the user cell. The device for discriminating timeout 5a discriminates that the timeout has occurred, and transfers a Segment Continuity Check (CC) cell to the switching equipment SW22, when the user cell has not been transferred for more than one second.

In the above-mentioned example, the switching equipment SW21 does not transfer the user cell to the switching equipment SW22 after transferring the each user cell to the switching equipment SW22 within one second. For this reason, the device for discriminating timeout 5a transfers the CC-cell to the switching equipment SW22 per one second.

The fault of the physical layer of the line L1 occurs in the fault occurrence point of the line L1, after the third CC-cell has been transferred. Then, the CC-cell from the fourth CC-cell on will not be transferred to the switching equipment SW22.

The device for discriminating timeout 5b discriminates that the timeout has occurred, for instance, when 3.5 seconds have passed since it received the third CC-cell. Namely, the device for discriminating timeout 5b is capable of confirming the trouble of the VC which occurred in the line L1.

Further, although the CC-cell is transferred per one second, when the user cell does not exist in the application example 2, the CC-cell can be transferred all the time, for instance, per one second, whether or not the use cell exists.

<EMBODIMENT 3>

Figure 9:
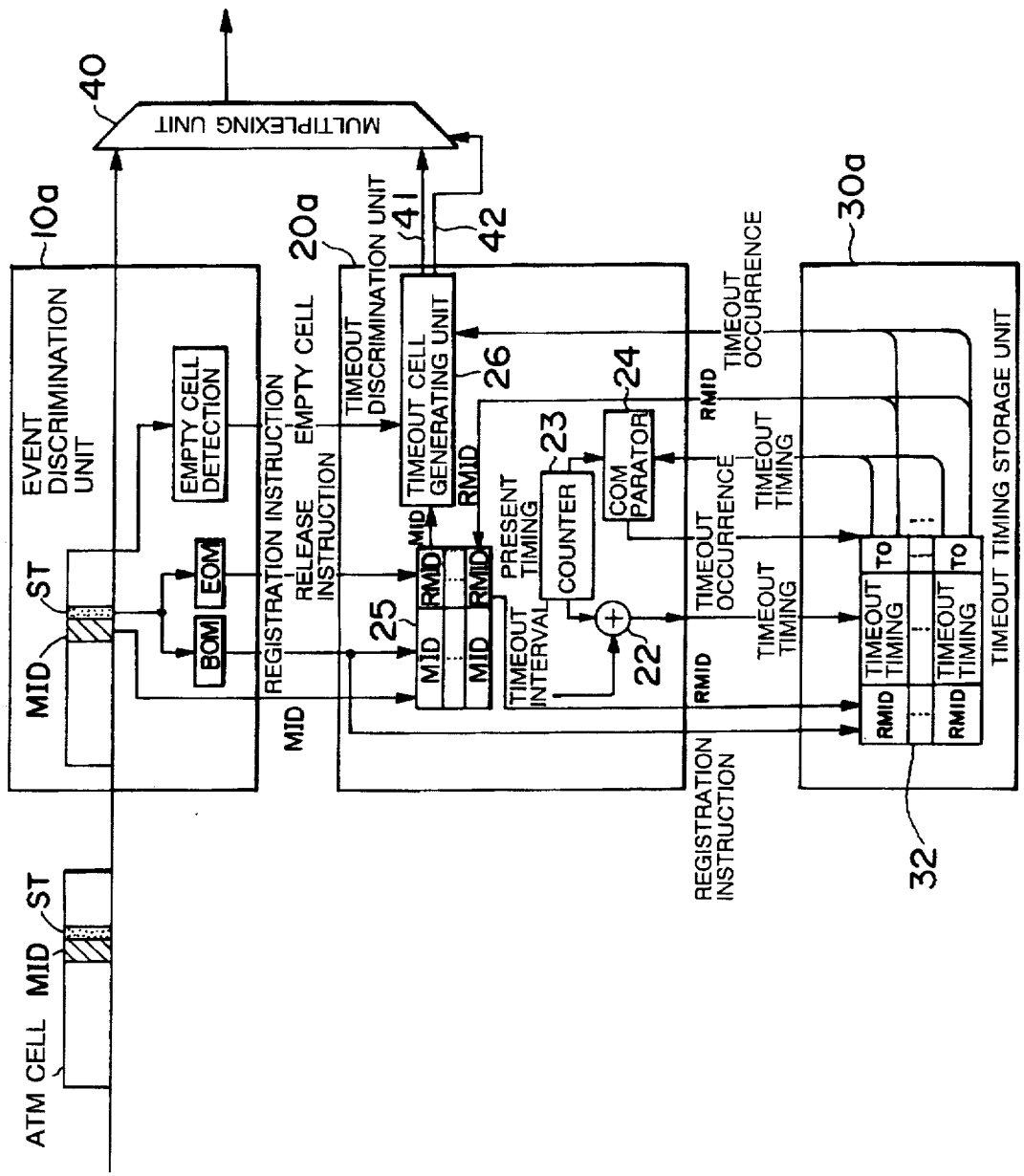
FIG. 9 is a construction diagram indicating a device for discriminating timeout according to the embodiment 3 of the present invention.

Then, the embodiment 3 of the present invention will be described. FIG. 9 is a diagram indicating a device for discriminating timeout according to the embodiment 3. The device for discriminating timeout of the embodiment 3 discriminates and notifies the timeout from the start of the message for every MID (Message Identifier) of AAL (ATM Adaptation Layer) Type ¾.

The device for discriminating timeout comprises an event discrimination unit 10a, a timeout discrimination unit 20a, a timeout timing storage unit 30a and a multiplexing unit 40 connected to the event discrimination unit 10a and the timeout discrimination unit 20a.

As shown in FIG. 7, the ATM cell includes a MID consisting of ten bits and a ST (Segment Type). The ST is a two-bit-information comprising a BOM (Beginning of Message) and an EOM (Ending of Massage).

The event discrimination unit 10a outputs a registration instruction signal for registering the MID and the MID included in the cell which has arrived to the timeout discrimination unit 20a, when the ST included in the cell which has arrived is the BOM.

The timeout discrimination unit 20a has a MID table 25 which converts the MID consisting of ten bits into, for instance, a RMID (Reduced Message Identifier) consisting of six bits.

The timeout discrimination unit 20a obtains an unused RMID from the RMID, and registers the MID corresponding to the RMID in the MID table 25.

The event discrimination unit 10a outputs a release instruction signal for releasing the RMID and the MID to the timeout discrimination unit 20a, when the ST included in the cell which has arrived is the EOM.

The timeout discrimination unit 20a sets the RMID corresponding to the MID as an unused RMID, when it inputted the release instruction signal and the MID, and uses the unused RMID when a new BOM arrives.

The timeout discrimination unit 20a has a MID table 25, an adder 22, a counter 23, a comparator 24 and a timeout cell generating unit 26.

The MID table 25 stores the MID corresponding to the RMID, and gives the RMID corresponding to the MID to the timeout timing storage unit 30a. The adder 22 adds the present timing counted by the counter 22 to the timeout interval, and gives the obtained timeout timing to the timeout timing storage unit 30a.

The timeout timing storage unit 30a has a timeout timing table 32. The timeout timing table 32 stores the timeout timing obtained by the adder 22 for the every RMID given by the MID table 25.

The comparator 24 compares the present timing with the each timeout timing stored in the timeout timing table 32.

The comparator 24 discriminates that the timeout has occurred when the present timing exceeds the each timeout timing, and stores an occurrence information TO of the timeout concerning the RMID in the timeout timing table 32.

Besides, the event discrimination unit 10a discriminates an empty cell which has arrived, and outputs the discriminated empty cell to the timeout cell generating unit 26. The timeout cell generating unit 26 retrieves the timeout cell timing table 32 and generates a timeout cell in reference to the RMID which has generated the timeout.

The timeout cell generating unit 26 reads out the MID corresponding to the RMID which has generated the timeout from the MID table 25, and transfers the timeout cell to which the read out MID was added to the multiplexing unit 40.

Besides, the timeout discrimination unit 26 transmits a switching signal for switching the multiplexing unit 40 from the event discrimination unit 10a to the timeout discrimination unit 20a to the multiplexing unit 40. The RMID is supposed to be unused, and the RMID is used when a new BOM arrives.

Further, the other constructions are the same as those of the embodiment 2, so the identical parts will be described by adding the identical codes to them.

<OPERATION OF THE EMBODIMENT 3>

Figure 10:
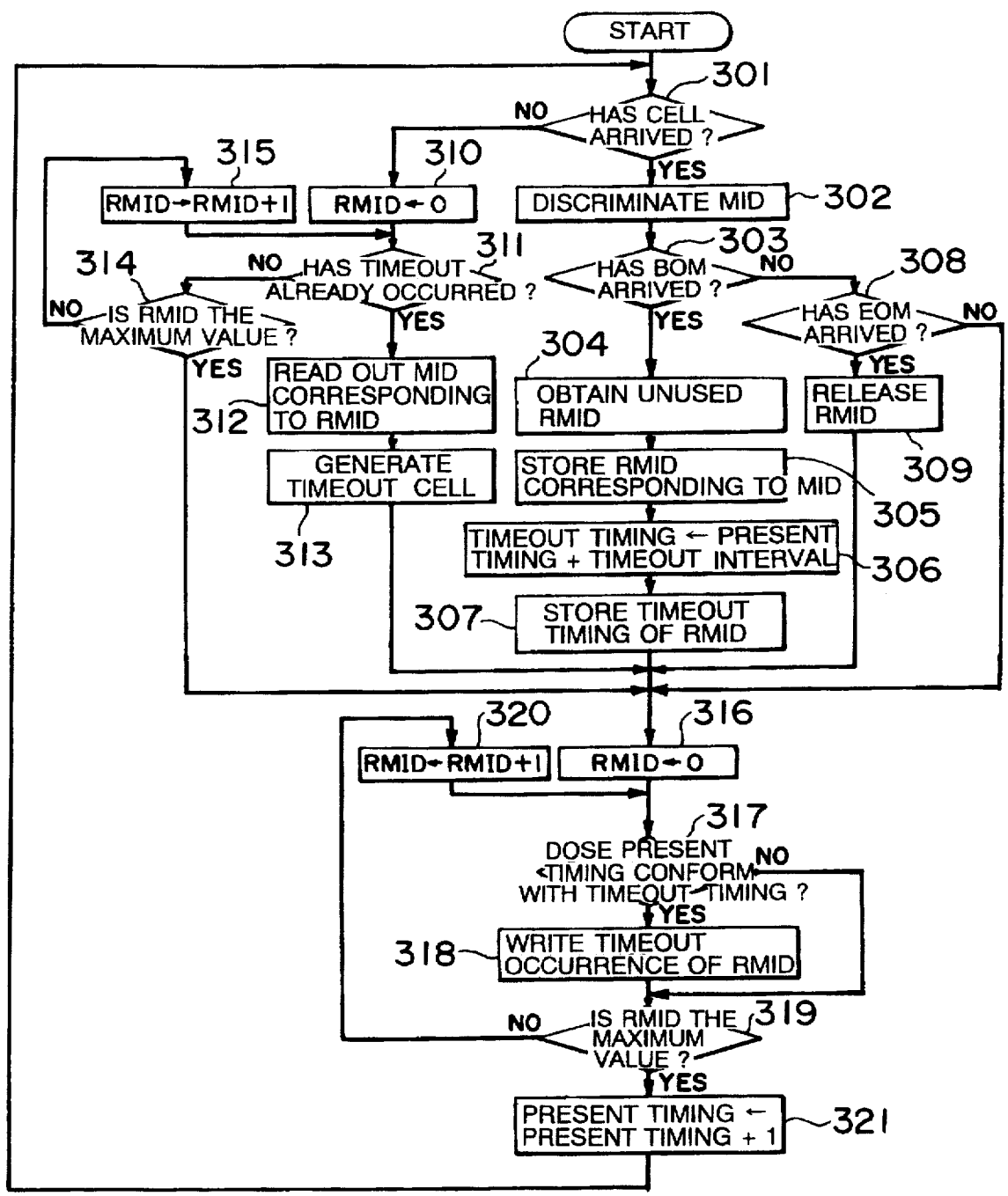
FIG. 10 is a flowchart indicating a method for discriminating timeout according to the embodiment 3 of the present invention.

Then, a method for discriminating time out according to the embodiment 3 constructed in the above-mentioned way will be described. FIG. 10 is a flowchart indicating the method for discriminating timeout according to claim 3. First of all, the event discrimination unit 10a discriminates whether or not the cell has arrived (Step 301), and the process proceeds to Step 310 when the cell has not arrived.

On the other hand, the event discrimination unit 10a discriminates the MID included in the cell (Step 302), and discriminates whether or not the BOM has arrived (Step 303), when the cell arrived.

The timeout discrimination unit 20a obtains the unused RMID (Step 304), and stores the RMID corresponding to the MID per the MID in the MID table 25 (Step 305), when the BOM arrived.

Then, the adder 22 obtains the timeout timing corresponding to each RMID by adding the present timing counted by the counter 23 to the timeout interval determined per RMID (Step 306).

Further, timeout timing storage unit 30a stores the timeout timing obtained by the adder 22 per RMID in the timeout timing table 32 (Step 307).

On the other hand, in Step 303, the event discrimination unit 10a determines whether or not the EOM has arrived when the BOM has not arrived (Step 308), and the process proceeds to Step 316, when the EOM does not arrive.

The timeout discrimination unit 20a releases the RMID (Step 309), and the process proceeds to Step 316, when the EOM arrived.

On the other hand, in step 301, the timeout timing storage unit 30a sets the RMID "0", when the cell has not arrived (Step 310). It is discriminated whether or not the present timing has exceeded the timeout timing stored in the timeout timing table 32, namely, whether or not the timeout has already occurred, when the RMID is "0" (Step 311).

The timeout discrimination unit 20a reads out the MID corresponding to the RMID from the MID table 25, when the timeout occurred from the MID table 25, after the timeout has occurred (Step 312).

The process proceeds to Step 316, when the timeout cell generating unit 26 generates the timeout cell to which the MID was added (Step 313).

On the other hand, the timeout timing storage unit 30a discriminates whether or not the RMID is the maximum value, when the timeout has not occurred yet (Step 314). The process proceeds to Step 316, when the RMID is the maximum value.

Further, the RMID in which "1" was added to the RMID is set as a new RMID (Step 315), and the process returns to Step 311, when the RMID is not the maximum value.

Then, the timeout timing storage unit 30a sets the RMID "0" (Step 316). The comparator 24 reads out the timeout timing from the timeout timing table 32, and determines whether or not the present timing counted by the counter 23 conforms with the timeout timing, when the RMID is "0"

(Step 317). The process proceeds to Step 319, when the present timing does not conform with the timeout timing.

When the present timing conforms with the timeout timing, the comparator 24 writes the timeout occurrence information TO of the RMID into the timeout timing table 32 (Step 318), and determines whether or not the RMID is the maximum value (Step 319).

Hereupon, the RMID in which "1" was added to the RMID is set as a new RMID (Step 320), and the process returns to Step 317, when the RMID is not the maximum value. The processes from Step 317 to Step 318 are executed repeatedly until the RMID becomes the maximum value.

On the other hand, in Step 319, the counter 23 sets the timing in which "1" was added to the present timing as a new present timing, when the RMID is the maximum value (Step 321). The process returns to Step 301, and the process is repeated from Step 301.

Further, in the example shown in FIG. 9, "1" was added to the RMID, and the timeout timing was compared with the present timing one after another in reference to each RMID for the sake of convenience. For instance, the device for discriminating timeout can be provided with a plurality of comparators, and can compare the timeout timing with the present timing in reference to a plurality of RMIDs in parallel.

As mentioned hereinbefore, the device for discriminating timeout converts each MID of 10 bits into each RMID of 6 bits, stores the timeout timing per RMID and discriminates the timeout. Accordingly, a plurality of communications can be executed without using a plurality of timers, and the memory capacity can be kept small.

Besides, the device for discriminating timeout assigns one RMID to each communication, when the event occurred. The device for discriminating timeout releases the RMID, when the event was ended, or when the timeout occurred. Accordingly, a plurality of communications can be executed with a few RMIDs.

Moreover, the device for discriminating timeout can store the timeout occurrence information when it is discriminated that the timeout has occurred, and can notify the timeout to the outside processor and so on by transmitting the timeout cell when the cell is an empty cell.

Further, in the embodiment 3, the RMID corresponding to the MID is used. For instance, the RVCI of 10 bits corresponding to the VCI of 16 bits may be used, when the VCI is used as an identifier. Besides, for instance, the RVPI of 8 bits corresponding to the VPI of 12 bits may be used, when the VPI is used as an identifier.

Figure 11:
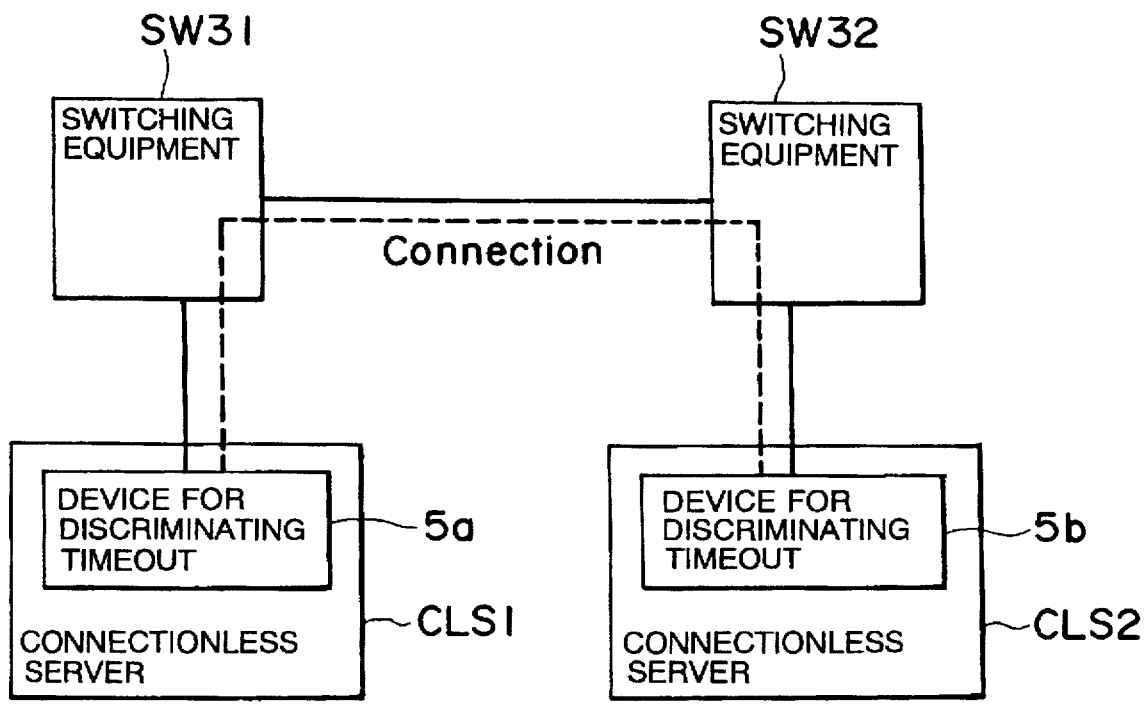
FIG. 11 is a construction diagram indicating an application example 3 of a device for discriminating timeout.

Then, the application example 3 of the device for discriminating timeout will be described. FIG. 11 is a construction diagram indicating the application example 3 of t device for discriminating timeout. In FIG. 11, a connectionless server CLS1 is connected to a switching equipment SW31. A connectionless server CLS2 is connected to an switching equipment SW32.

The connectionless servers CLS1 and CLS2 execute a connectionless service, and terminate a connection protocol and execute a routing of a cell transmitted to the receiving side by a routing information included in the BOM and so on. A connection indicated by dotted lines is established in the switching equipment SW31 and the switching equipment SW32.

The connectionless server CLS1 has the device for discriminating timeout 5a, and the connectionless server CLS2 has the device for discriminating timeout 5b.

Figure 12:
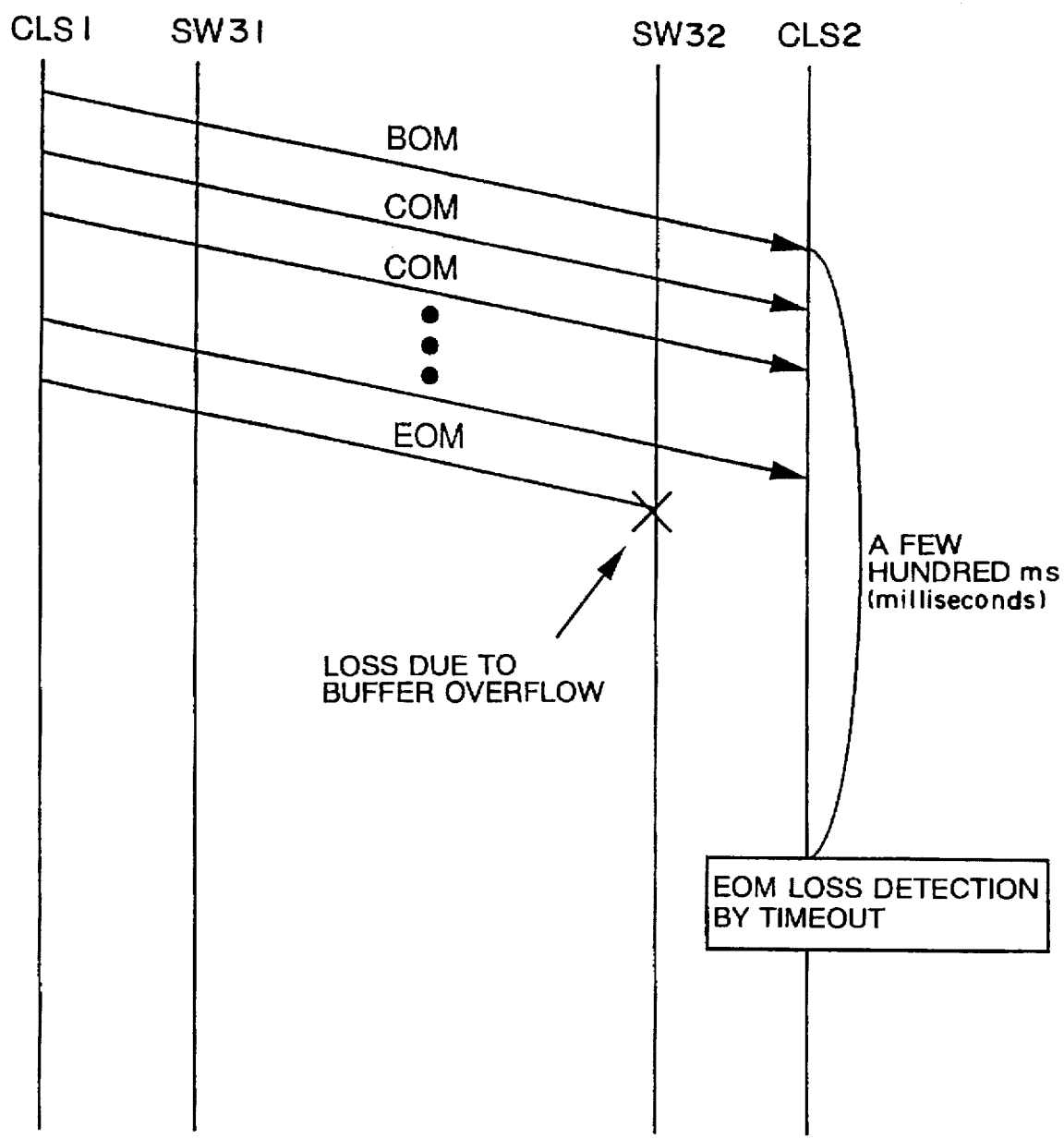
FIG. 12 is a diagram indicating an operation of an application example 3 of a device for discriminating timeout.

FIG. 12 is a diagram indicating an operation of the application example 3 of the device for discriminating timeout. The operation of the application example 3 of the device for discriminating timeout will be described by referring to FIG. 12. First of all, the connectionless server CLS1 establishes the connection on the basis of the BOM indicating a destination, and transfers the BOM to the connectionless server CLS2 through the switching equipment SW31 and the switching equipment SW32.

Then, the connectionless server CLS1 transfers a COM (Continuing Of Message) to the connectionless server CLS2 per fixed interval through the switching equipment SW31 and the switching equipment SW32.

At the end, the connectionless server CLS1 transfers an EOM to the switching equipment SW32 through the switching equipment SW31. Whereupon, the unillustrated cell buffer included in the switching equipment SW32 generates a buffer overflow, and discards the EOM. For this reason, the EOM is not transferred to the connectionless server CLS 2.

On the other hand, in the connectionless server CLS2, the device for discriminating timeout 5b determines whether or not the EOM has been received within the predetermined interval since it received the BOM. The device for discriminating timeout 5b discriminates that the timeout has occurred, when the EOM has not been received, for instance, within a few hundred milliseconds since it received the BOM. Accordingly, it is possible to detect an EOM loss.

Moreover, the device for discriminating timeout 5b releases the MID, when the connectionless server CLS2 lets the cell flow.

Further, the device for discriminating timeout 5b discards a message, when the connectionless server generates the message.

<EMBODIMENT 4>

Figure 13:
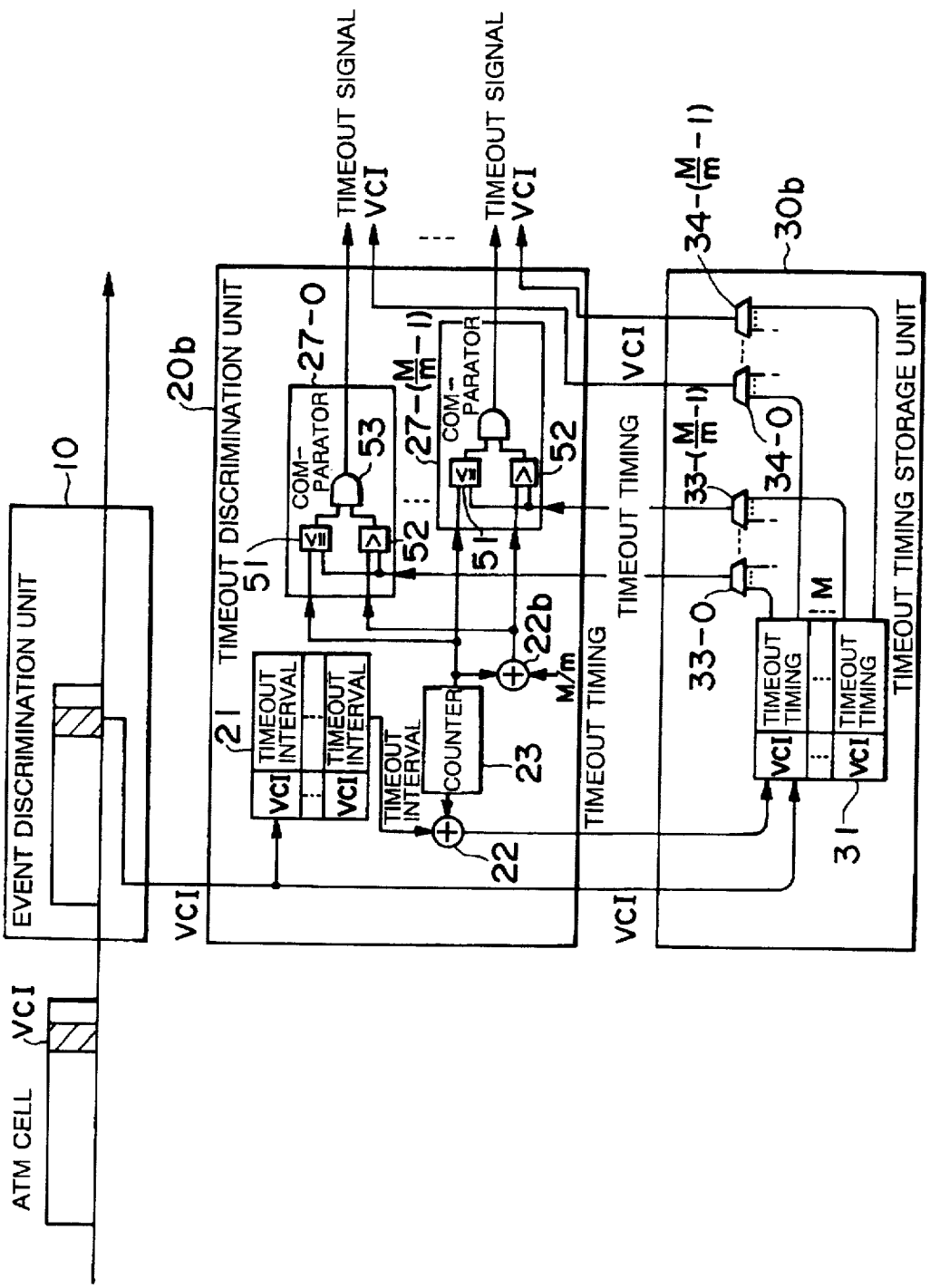
FIG. 13 is a construction diagram indicating a device for discriminating timeout according to the embodiment 4 of the present invention.

Then, the embodiment 4 of the present invention will be described. FIG. 13 is a diagram indicating the device for discriminating timeout according to the embodiment 4 of the present invention. In the embodiment 4, the device for discriminating timeout for executing a plurality of communications discriminates that the timeout has occurred, when the number of communication discriminations in which the timeout is discriminated within one cell interval is smaller than the number of the plurality of communications, and when a predetermined condition is formed among the present timing, the timeout timing, the number of communication discriminations and the number of communications.

Hereupon, the number of VCIs dealt with simultaneously is "M". The number of VCIs in which the timeout is discriminated within one cell interval is "m". The device for discriminating timeout counts up only one present timing within one cell processing interval, and discriminates that the timeout has occurred, when the timeout timing exceeds the present timing and the timeout timing is less than the timing in which "M/m" was added to the present timing. The detailed construction of the device for discriminating timeout will be described.

The device for discriminating timeout comprises an event discrimination unit 10, a timeout discrimination unit 20b and a timeout timing storage unit 30b. The timeout discrimination unit 20b has a VCI table 21, a counter 23 and an adder 22 connected to the counter 23 and the VCI table 21.

The timeout discrimination unit 20b has an adder 22b connected to the counter 23 and comparators 27-0-27-(M/m−1) connected to the counter 23 and the adder 22b.

The timeout timing storage unit 30b has a VCI table 31 and a plurality of selector blocks 33-0-33-(M/m−1) and 34-0 - 34-(M/m−1) connected to the VCI table 31.

Each of the plurality of selector blocks 33-0 - 33-(M/m−1) has m pieces of selector corresponding to m pieces of VCI which are capable of discriminating timeout within one cell processing interval.

The m pieces of selector of each selector block are connected to the corresponding m pieces of VCI of the VCI table 31. Each selector block outputs the m pieces of timeout timing corresponding to the m pieces of VCI to the corresponding comparators 27-0 - 27-(M/m−1) by selecting each selector within the block in order.

Besides, like the selector blocks 33-0 -33-(M/m−1), each of the selector blocks 34-0 -34-(M/m−1) is also connected to the corresponding m pieces of VCI of the VCI table 31, and outputs each VCI from the VCI table 31. The counter 23 counts up each VCI one by one within one cell processing interval.

The counter 22b adds "M/m" to the present timing counted by the counter 23 so as to obtain an add time. Each of the comparators 27-0 - 27-(M/m−1) comprises a lower limit comparator 51, an upper limit comparator 52 and an AND circuit 53 connected to the lower limit comparator 51 and the upper limit comparator 52.

The lower limit comparator 51 outputs a H level to the AND circuit 53, when the timeout timing outputted from the corresponding selector block is larger than the present timing counted by the counter 23. The upper limit comparator 52 outputs the H level to the AND circuit 53, when the timeout timing outputted from the corresponding selector block is smaller than the add timing obtained by the adder 22b. The AND circuit 53 outputs a timeout signal, when it inputted the H level from the lower limit comparator 51 and the upper limit comparator 52.

Further, in FIG. 13, the identical codes are added to the same parts as the parts shown in the embodiment 2, and the detailed description about the parts will be omitted.

<OPERATION OF THE EMBODIMENT 4>

Figure 14:
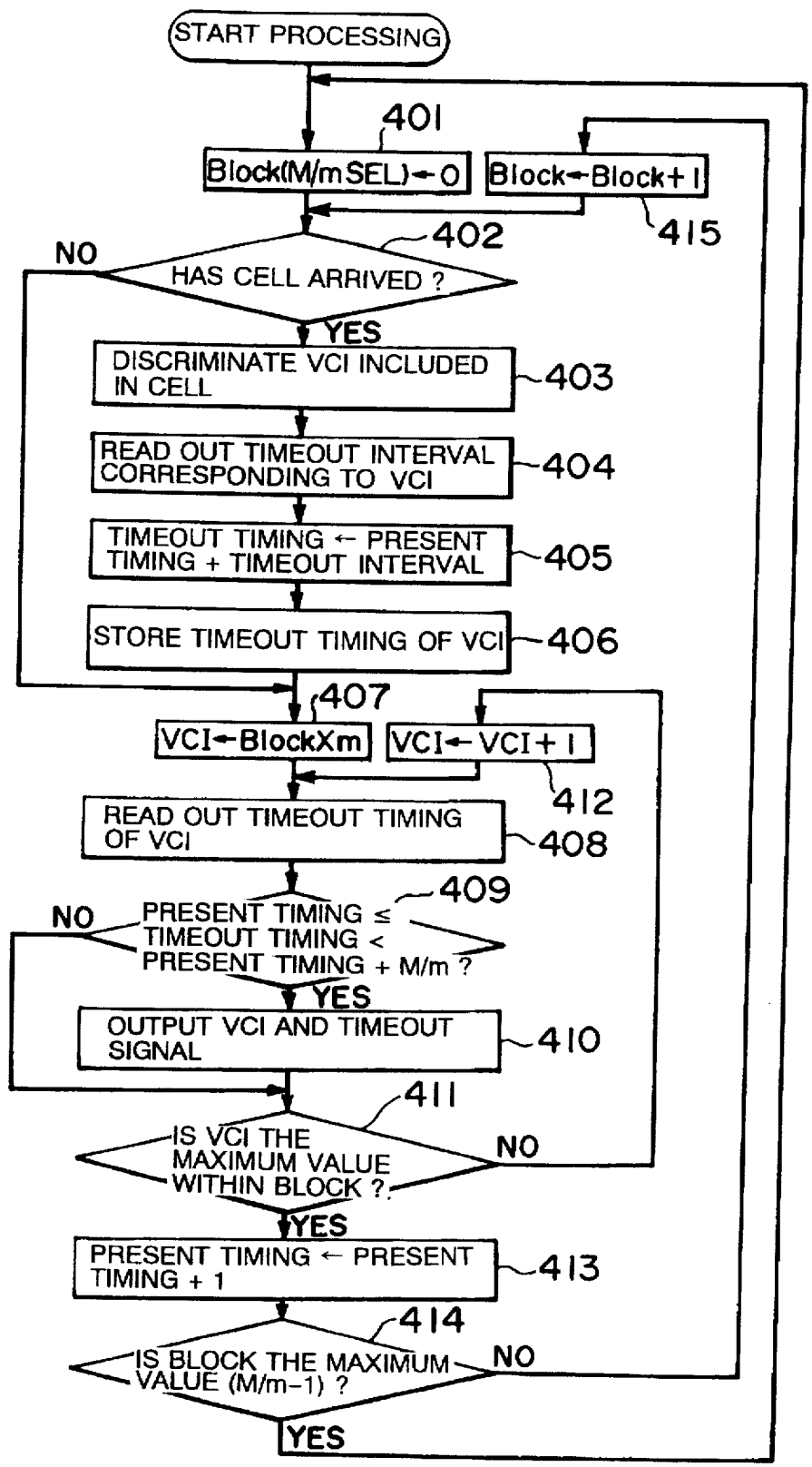
FIG. 14 is a flowchart indicating a method for discriminating timeout according to the embodiment 4 of the present invention.

Then, a method for discriminating timeout according to the embodiment 4 will be described. FIG. 14 is a flowchart indicating the method for discriminating timeout according to the embodiment 4. First of all, the timeout timing storage unit 30b sets the number of blocks "0" so as to select the selector block 33-0 (Step 401).

Then, the event discrimination unit 10 discriminates whether or not the cell has arrived (Step 402). The process proceeds to Step 407, when the cell has not arrived.

On the other hand, the event discrimination unit 10 discriminates the VCI included in the cell, when the cell arrived (Step 403).

Then, the timeout discrimination unit 20b reads out the timeout interval corresponding to the VCI discriminated by the event discrimination unit 10 from the VCI table 21 (Step 404). The adder 22 adds the cell occurrence timing counted by the counter 23 to the timeout interval read out from the VCI table 21 so as to obtain the timeout timing (Step 405).

Further, the timeout timing storage unit 30b registers the timeout timing per VCI obtained by the adder 22 in the region corresponding to the VCI of the timeout timing table 31 (Step 406). Alternatively, the timeout timing storage unit 30b renews the timeout timing.

Then, the timeout timing storage unit 30b obtains the VCI by multiplying the number of blocks by the number m of communication discriminations within one cell processing interval (Step 407). The selector block 33-0 reads out the timeout timing stored in the timeout timing table 31 when the VCI is "0" into the comparator 27-0 (Step 408).

Then, the comparator 27-0 determines whether or not the timeout timing exceeds the present timing, and the timeout timing is less than the timing in which "M/m" was added to the present timing (Step 409). Hereupon, the comparator 27-0 outputs the timeout signal to the outside, when the timeout timing exceeds the present timing and is less than the timing in which "M/m" was added to the present timing. Besides, the selector block 34-0 outputs the VCI from the timeout timing table 31 to the outside (Step 410).

For instance, the operation when the comparator 27-0 outputs the timeout signal to the outside will be described briefly. The lower limit comparator 51 outputs the H level to the AND circuit 53, when the timeout timing read out from the selector block 33-0 is larger than the present timing counted by the counter 23.

Besides, the upper limit comparator 52 outputs the H level to the AND circuit 53, when the timeout timing read out from the selector block 33-0 is smaller than the add timing obtained by the adder 22b. The AND circuit 53 outputs the timeout signal after inputting the H level from the lower limit comparator 51 and the upper limit comparator 52.

On the other hand, in Step 409, the process proceeds to Step 411, when the timeout timing is below the present timing, or when the timeout timing exceeds the timing in which "M/m" was added to the present timing.

In step 411, the timeout discrimination unit 20b discriminates whether or not the VCI is the maximum value within the block. When the VCI is not the maximum value within the block, the VCI in which "1" was added to the VCI is set as a new VCI (Step 412), and the process returns to Step 408.

Namely, each selector within the selector block 33-0 reads out each of the timeout timings in each VCI into the comparator 27-0 in order until the VCI becomes the maximum value in the block within one cell processing interval. Then, the timeout discrimination unit 20b discriminates whether or not the timeout has occurred per VCI.

Secondly, the counter 23 counts up only "1" present timing (Step 413). Then, the timeout discrimination unit 20b discriminates whether or not the block is the maximum value, namely, whether or not the selector block 33-(M/m−1) was selected (Step 414).

The timeout discrimination unit 20b counts up only one block (Step 415), selects the next selector block and executes the processes from Step 402 to Step 413 repeatedly, when the block is not the maximum value. Namely, each selector block from the selector block 33-1 to the selector block 33-(M/m−1) is selected.

Then, each selector of each of the selector blocks reads out each timeout timing corresponding to each VCI within the block, and the comparators 27-1 - 27-(M/m−1) corresponding to the block discriminates the timeout. Moreover, the process returns to Step 401, when the block exceeds the maximum value.

Further, in the example of FIG. 13, "1" was added to the VCI and the timeout timing was compared with the present timing one after another in reference to each VCI for the sake of convenience. A plurality of comparators can be provided to compare the timeout timing with the present timing in reference to the plurality of VCIs in parallel.

As mentioned hereinbefore, in the embodiment 4, only M pieces of VCI exist, and the number of VCIs which can discriminate the timeout within one cell interval is "m". In this case, it takes only "M/m" cell intervals to discriminate the timeout in reference to all of the VCIs. It sometimes happens that the timeout occurs in reference to one of the VCIs within the "M/m" cell interval.

For this reason, the device for discriminating timeout can count up the present timings counted by the counter 23 one by one within one cell processing interval, and discriminate that the timeout has occurred, when the timeout timing exceeds the present timing and is less than the timing in which "M/m" was added to the present timing.

Further, in the embodiment 4, the selector blocks 33-0 - 33-(M/m−1) and 34-0 - 34-(M/m−1) were installed on the timeout timing storage unit 30b. For instance, the selector blocks also can be installed on the timeout discrimination unit 20b.

<EMBODIMENT 5>

Figure 15:
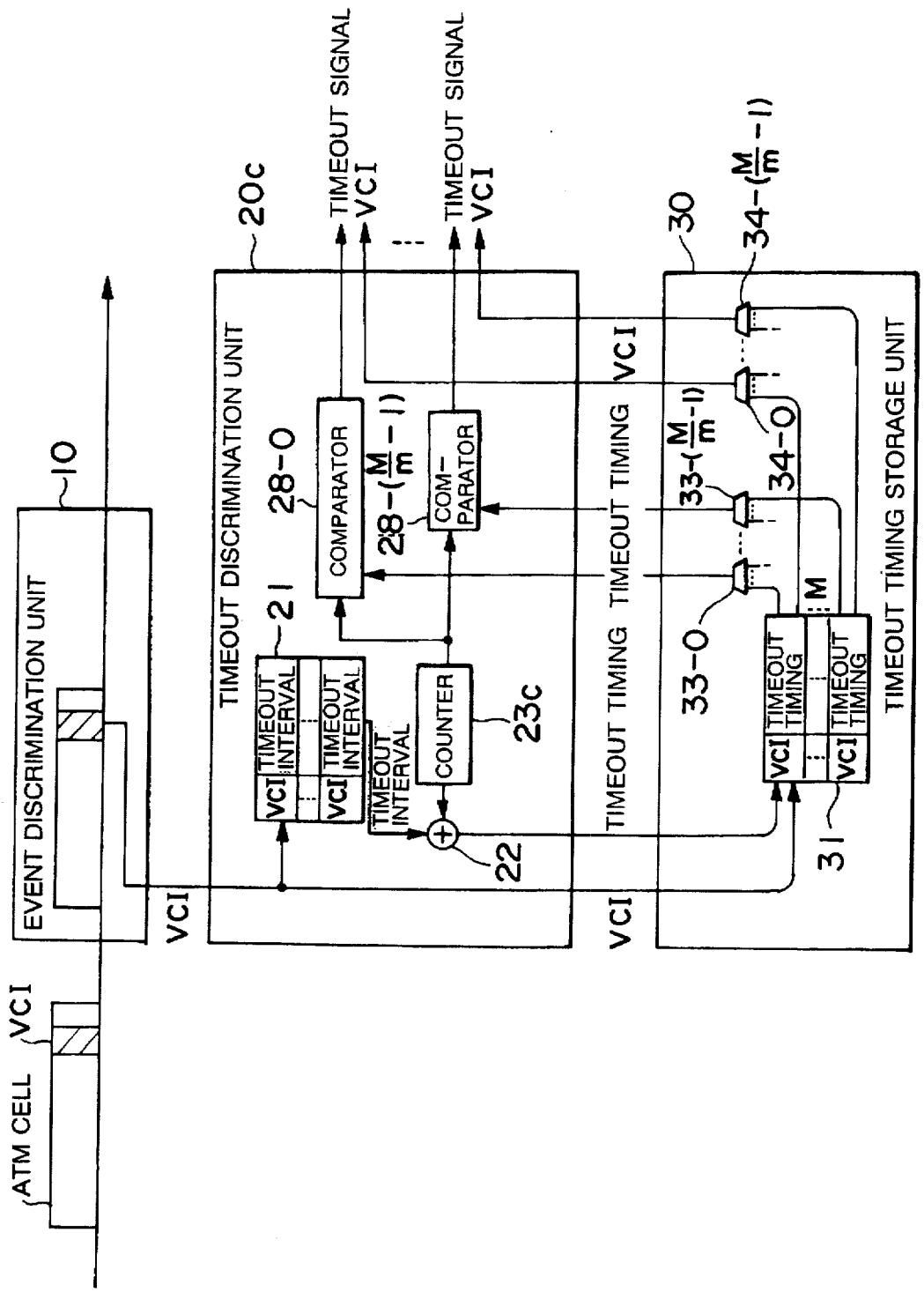
FIG. 15 is a construction diagram indicating a device for discriminating timeout according to the embodiment 5 of the present invention.

Then, the embodiment 5 of the present invention will be described. FIG. 15 is a diagram indicating the device for discriminating timeout according to the embodiment 5 of the present invention. The embodiment 5 is a deformed example of the embodiment 4.

The device for discriminating timeout counts up present timing counted by the counter one by one within "M/m" cell processing interval, and discriminates that the timeout has occurred when the timeout timing becomes the present timing. The detailed construction of the device for discriminating timeout will be described.

The device for discriminating timeout comprises an event discrimination unit 10, a timeout discrimination unit 20c connected to the event discrimination unit 10 and a timeout timing storage unit 30b connected to the timeout discrimination unit 20c.

The timeout discrimination unit 20c has a VCI table 21, a counter 23c, an adder 22 connected to the counter 23c and the VCI table 21 and comparators 28-0 - 28-(M/m−1) connected to the counter 23c.

The constructions of the timeout timing storage unit 30b are the same as those described in the embodiment 4, so the detailed description about them will be omitted. Further, each of the selector blocks 33-0 - 33-(M/m−1) outputs m pieces of timeout timing corresponding to m pieces of VCI to the corresponding comparators 28-0 - 28-(M/m−1) by selecting each selector within the block in order.

The counter 23c counts up the timeout timings one by one within "M/m" cell processing interval. Each of the plurality of comparators 28-0 - 28-(M/m−1) outputs the timeout signal, when the timeout timing outputted from the corresponding selector block conforms with the present timing counted by the counter 23c.

Further, in FIG. 15, the identical codes are added to the same parts as the parts shown in the embodiment 2, and the detailed description about the parts will be omitted.

<OPERATION OF THE EMBODIMENT 5>

Figure 16:
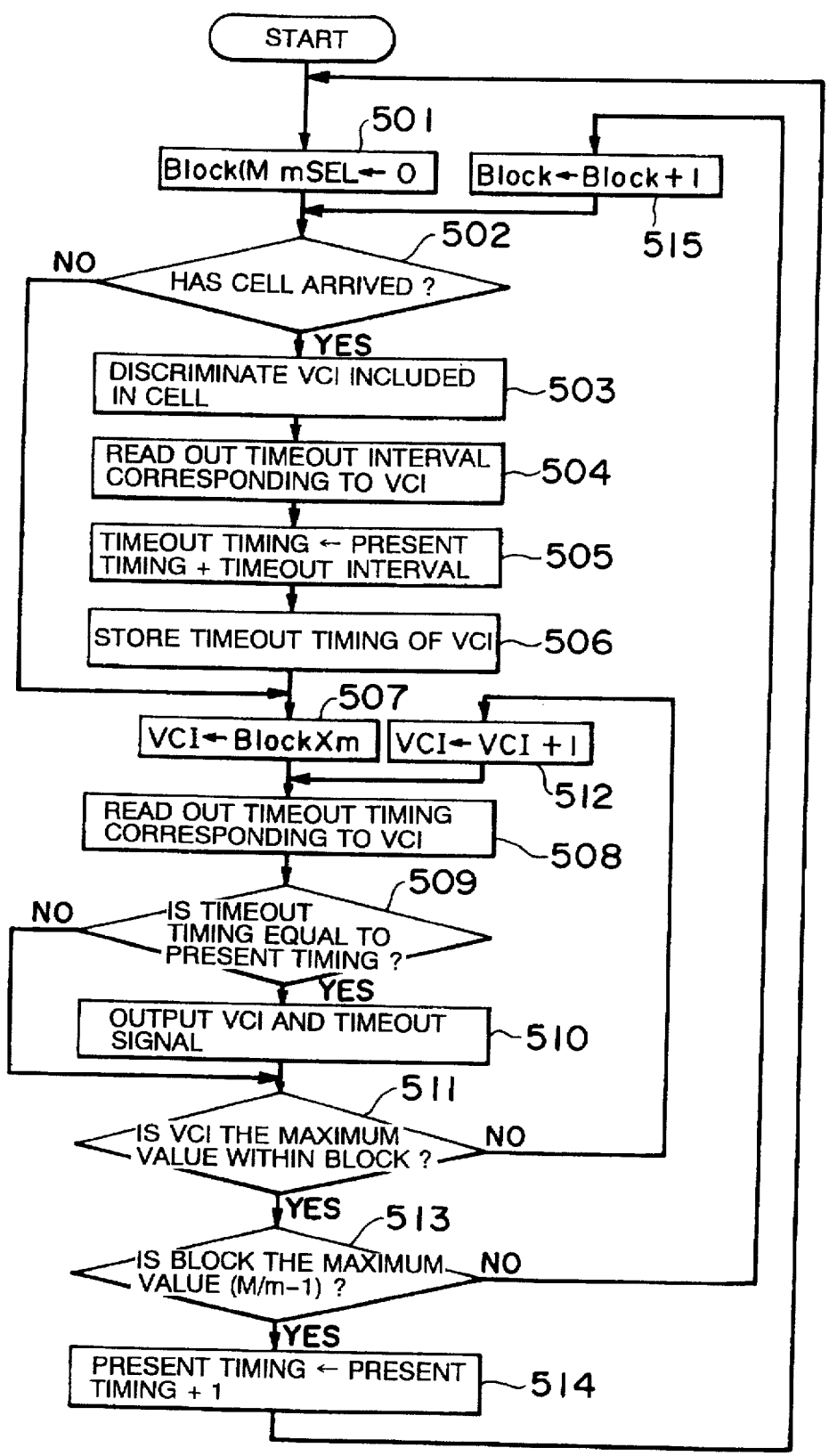
FIG. 16 is a flowchart indicating a method for discriminating timeout according to the embodiment 5 of the present invention.

Then, the method for discriminating timeout according to the embodiment 5 will be described. FIG. 16 is a flowchart indicating the method for discriminating timeout according to the embodiment 5. First of all, the timeout discrimination unit 20c sets the number of blocks "0" so as to select the selector block 33-0 (Step 501).

Then, the event discrimination unit 10 discriminates whether or not the cell has arrived (Step 502), and the process proceeds to Step 507, when the cell has not arrived.

On the other hand, the event discrimination unit 10 discriminates the VCI included in the cell, when the cell has arrived (Step 503).

Then, the timeout discrimination unit 20c reads out the timeout timing corresponding to the VCI discriminated by the event discrimination unit 10 from the VCI table 21 (Step 504). The adder 22 obtains the timeout timing by adding the cell occurrence timing counted by the counter 23 to the timeout interval read out from the VCI table 21 (Step 505).

Further, the timeout timing storage unit 30b registers the timeout timing per VCI obtained by the adder 22 in the region corresponding to the VCI of the timeout timing table 31 (Step 506). Alternatively, the timeout timing storage unit 30b renews the timeout timing.

Then, the timeout timing storage unit 30b obtains the VCI by multiplying the number of blocks by the number m of communication discriminations within one cell processing interval (Step 507). The selector block 33-0 reads out the timeout timing stored in the timeout timing table 31 into the comparator 28-0, when the VCI is "0" (Step 508).

Then, the comparator 28-0 discriminates whether or not the timeout timing is the present timing counted by the counter 23c (Step 509). Hereupon, the comparator 28-0 outputs the timeout signal to the outside, when the timeout timing is the present timing. Besides, the selector block 34-0 outputs the VCI to the outside from the timeout timing table 31 (Step 510).

On the other hand, in Step 509, the process proceeds to Step 511, when the timeout timing is not the present timing.

In step 511, the timeout discrimination unit 20c discriminates whether or not the VCI is the maximum value within the block. The timeout discrimination unit 20c sets the VCI in which "1" was added to the VCI as new VCI (Step 512), and the process returns to Step 508, when the VCI is not the maximum value within the block.

Namely, each selector within the selector block 33-0 reads out each timeout timing in each of the VICs into the comparator 28-0 in order, until the VCI becomes the maximum value in the block within one cell processing interval. Then, the timeout discrimination unit 20c discriminates whether or not the timeout has occurred per VCI.

Then, the timeout discrimination unit 20c determines whether or not the block is the maximum value, namely, whether or not the selector block 33-(M/m−1) was selected (Step 513).

The timeout discrimination unit 20c counts up only one block (Step 515) when the block is not the maximum value, selects the next selector block and executes the processes from Step 502 to Step 513 repeatedly. Namely, each of the selector blocks from the selector block 33-1 to the selector block 33-(M/m−1) is selected.

Then, each selector of the each selector block reads out each timeout timing corresponding to each VCI within the block, and the comparators 28-1 - 28-(M/m−1) corresponding to the block discriminate the timeout. Moreover, the counter 23c counts up only one present timing (Step 514), and the process returns to Step 501, when the block exceeds the maximum value.

Further, in the example of FIG. 10, although "1" was added to the VCI and the timeout timing was compared with the present timing one after another for the sake of convenience, a plurality of comparators can be provided to compare the timeout timing with the present timing in reference to the plurality of VCIs in parallel.

In the device for discriminating timeout, the VCI is "M". The number of VCIs which can discriminate the timeout within one cell interval is "m". In this case, it takes "M/m" cell intervals to discriminate the timeout in reference to all of the VCIs. Besides, it sometimes happens that the timeout occurs in reference to one of the VCIs within the "M/m" cell interval.

For this reason, the device for discriminating timeout can count up the present timing counted by the counter 23c one by one within the "(M/m)" cell processing interval, and discriminate that the timeout has occurred when the timeout timing becomes the present timing.

Further, in the embodiment 5, the selector blocks 33-0 - 33-(M/m−1) and 34-0 - 34-(M/m−1) are installed on the timeout timing storage unit 30b. For instance, the selector blocks also can be installed on the timeout discrimination unit 20c.

What is claimed is:

1. A method for discriminating timeout, comprising;
   an event discrimination step for discriminating whether or not an event indicating a start of the timeout discrimination has occurred in each communication of a plurality of communications, and outputting identification information in order to identify the communication that the event occurred in;
   a calculation step for calculating a timeout timing for the communication on the basis of the identification information outputted from said event discrimination step;
   a storage step for storing the timeout timing calculated in said calculation step for the identification information; and
   a timeout discrimination step for comparing the timeout timing stored in said storage step for the identification information with a present timing, and discriminating that the timeout has occurred in reference to the identification information when the present timing exceeds the stored timeout timing.

2. A method for discriminating timeout according to claim 1,
   wherein said event discrimination step discriminates whether or not the event has occurred in each connection when an input cell of fixed length concerning each connection is received, and outputs the identification information which is included in the input cell.

3. A method for discriminating timeout according to claim 2,
   wherein said timeout discrimination step further includes a step of storing an occurrence information including an occurrence of the timeout, when it discriminates that the timeout has occurred, and generating a timeout cell from the occurrence information and an empty cell and outputting the timeout cell to the outside.

4. A method for discriminating timeout according to claim 2,
   wherein the identification information is one of a virtual path identifier indicating a destination, a virtual channel identifier indicating a destination and a message identifier for identifying a message.

5. A method for discriminating timeout according to claim 4,
   wherein said timeout discrimination step further includes a step of converting the identification information consisting of the plurality of bits into a reduced identifier consisting of a number of bits smaller than the plurality of bits;
   said storage step stores the timeout timing for the reduced identifier converted in said timeout discrimination step; and
   said timeout discrimination step further includes a step of comparing the stored timeout timing for the reduced identifier with the present timing, and discriminating that the timeout has occurred in reference to the reduced identifier when the present time exceeds the timeout timing.

6. A method for discriminating timeout according to claim 5,
   wherein said timeout discrimination step further includes a step of assigning the reduced identifier in order to identify the communication that the event occurred in, and releasing the reduced identifier from the communication at either the end of the event or the timeout occurrence.

7. A method for discriminating timeout according to claim 2, further comprising:
   a counting step for incrementing the present timing by one each cell processing interval, when a number of communication discriminations of the timeout to be discriminated within each cell processing interval is smaller than a number of the plurality of communications;
   an addition step for adding to the present timing counted in said counting step a number of divisions obtained by dividing the number of the plurality of communications by the number of communication discriminations;
   a readout step for executing a readout processing for reading out the stored timeout of the number of communication discriminations for every communication within each cell processing interval in order, and reading out all of the timeout timings by executing the readout processing repeatedly within the cell processing interval of the number of divisions; and
   a comparison step for discriminating that the timeout has occurred in reference to the communication when the read out timeout timing for the every communication is within the range from the counted present timing to the timing obtained by said addition step.

8. A method for discriminating timeout according to claim 2, further comprising:
   a counting step for incrementing the present timing each cell processing interval by a number of divisions obtained by dividing the number of the plurality of communications by the number of communication discriminations, when a number of communication discriminations of the timeout to be discriminated within each cell processing interval is smaller than a number of the plurality of communications;
   a readout step for executing a readout processing for reading out the stored timeout timing of the number of communication discriminations for the every communication within each cell processing interval in order, and reading out all of the timeout timings by executing the readout processing repeatedly within the cell processing interval of the number of divisions; and
   a comparison step for discriminating that the timeout has occurred in reference to the communication when the read out timeout timing for the every communication conforms with the counted present timing.

9. A device for discriminating timeout, comprising:
   event discrimination means for discriminating whether or not an event indicating a start of the timeout discrimination has occurred in a communication device for executing a plurality of communications, and outputting identification information in order to identify the communication that the event occurred in;

timing storage means for storing a predetermined timeout timing for the every communication;

calculation means for calculating the timeout timing for the communication on the basis of the identification information outputted from said event discrimination means;

storage means for storing the timeout timing calculated in said calculation means for the identification information; and timeout discrimination means for comparing the timeout timing read out from said storage means for the identification information with a present timing, and discriminating that the timeout has occurred in reference to the identification information when the present timing exceeds the timeout timing.

10. A device for discriminating timeout according to claim 9, wherein said event discrimination means discriminates whether or not the event has occurred in each connection when an input cell of fixed length concerning each connection is received, and outputs the identification information which is included in the input cell.

11. A device for discriminating timeout according to claim 10, wherein said timeout discrimination means has timeout cell generating means for storing an occurrence information indicating an occurrence of the timeout in said timing storage means, when it discriminates that the timeout has occurred, and generating a timeout cell from the occurrence information and an empty cell and outputting the timeout cell to an outside.

12. A device for discriminating timeout according to claim 10, wherein the identification information is one of a virtual path identifier indicating a destination, a virtual channel identifier indicating a destination and a message identifier for discriminating a message.

13. A device for discriminating a timeout according to claim 12, wherein said timeout discrimination means has a conversion table for converting the identification information consisting of a plurality of bits into a reduced identifier consisting of a number of bits smaller than the plurality of bits;

said timing storage means stores the timeout timing for the reduced identifier which is converted by said conversion table; and said timeout discrimination means compares the timeout timing for the reduced identifier with the present timing, and discriminates that the timeout has occurred in reference to the reduced identifier when the present timing exceeds the timeout timing.

14. A device for discriminating timeout according to claim 13, wherein said timeout discrimination means assigns the reduced identifier in order in order to identify the communication the event occurred in, and releases the reduced identifiers from the communication at either the end of the event or the timeout occurrence.

15. A device for discriminating timeout according to claim 10, comprising:

counting means for incrementing the present timing by one each cell processing interval when a number of communication discriminations of the timeout to be discriminated within each cell processing interval is smaller than a number of the plurality of communications;

addition means for adding to the present timing counted by said counting means a number of divisions which is obtained by dividing the number of the plurality of communications by the number of communication discriminations;

readout means for executing a readout processing for reading out the timeout timing of the number of communication discriminations stored in said timing storage means per communication within each cell processing interval in order, and reading out all of the timeout timings by executing the readout processing repeatedly within the cell processing interval of the number of divisions; and comparison means for discriminating that the timeout has occurred in reference to the communication when the read out timeout timing from said readout means for the every communication is within the range from the present timing counted by said counting means to the timing obtained by said addition means.

16. A device for discriminating timeout according to claim 10, comprising:

counting means for incrementing the present timing each cell processing interval by a number of divisions obtained by dividing the number of the plurality of communications by the number of communication discriminations, when a number of communication discriminations of the timeout to be discriminated within each cell processing interval is smaller than a number of the plurality of communications;

readout means for executing a readout processing for reading out the timeout timing of the number of communication discriminations stored in said timing storage means for the every communication within the one cell processing interval in order, and reading out all of the timeout timings by executing the readout processing repeatedly within the cell processing interval of the number of divisions; and comparison means for discriminating that the timeout has occurred in reference to the communication when the timeout timings read out from said readout means for the every communication conforms with the present timing counted by said counting means.

17. A communication device for controlling a plurality of communication connections in which cells are transferred, comprising:

a reception section receiving a cell transferred in said plurality of communication connections;

a discrimination section for discriminating a connection of the cell received by said reception section;

a calculation section calculating a timeout timing on the basis of a receiving timing that the cell is received by said reception section;

a storage section storing the timeout timing calculated by said calculation section;

a search section searching a timeout timing which matches with present timing amount timeout timings stored in said storage section; and a transmission section transmitting a timeout cell indicating trouble condition has occurred in the connection corresponding to the timeout timing searched by said search section.

18. A communication device associated with a plurality of communication connections in which cells are transferred, comprising:

a reception section receiving a cell transferred in said plurality of communication connections;

a discrimination section discriminating a connection of the cell received by said reception section;

a calculation section for calculating a comparison timing on the basis of a receiving timing that the cell is received by said reception section;

a storage section storing the comparison timing calculated by said calculation section;

a search section searching a comparison timing which matches with present timing among comparison timings stored in said storage section; and a transmission section transmitting a cell indicating trouble condition has occurred in the connection corresponding to the comparison timing searched by said search section.

* * * * *